(12) United States Patent
Morita et al.

(10) Patent No.: US 7,885,173 B2
(45) Date of Patent: Feb. 8, 2011

(54) WRITE-ONCE INFORMATION RECORDING MEDIUM AND DISK APPARATUS

(75) Inventors: Seiji Morita, Yokohama (JP); Koji Takazawa, Tokyo (JP); Kazuyo Umezawa, Yokohama (JP); Naoki Morishita, Yokohama (JP); Naomasa Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 185 days.

(21) Appl. No.: 12/362,413

(22) Filed: Jan. 29, 2009

(65) Prior Publication Data
US 2009/0196159 A1      Aug. 6, 2009

(30) Foreign Application Priority Data
Jan. 31, 2008     (JP) ............................. 2008-021906

(51) Int. Cl.
*G11B 7/24*     (2006.01)
(52) U.S. Cl. .................................. 369/275.4
(58) Field of Classification Search ................ None
See application file for complete search history.

(56) References Cited

U.S. PATENT DOCUMENTS

| | | |
|---|---|---|
| 2005/0219997 A1 | 10/2005 | Morita et al. |
| 2006/0088786 A1 | 4/2006 | Tamada et al. |
| 2007/0248784 A1 | 10/2007 | Morita et al. |
| 2008/0142759 A1* | 6/2008 | Pays ....................... 252/301.16 |
| 2008/0247304 A1 | 10/2008 | Umezawa et al. |
| 2009/0087620 A1* | 4/2009 | Li et al. ....................... 428/156 |
| 2009/0269543 A1* | 10/2009 | Monden et al. ............ 428/64.8 |

FOREIGN PATENT DOCUMENTS

| | | |
|---|---|---|
| EP | 1 906 401 A2 | 4/2008 |
| JP | 06-161025 | 6/1994 |
| JP | 2001-039032 A | 2/2001 |
| JP | 2003-308630 A | 10/2003 |
| JP | 2004-195765 | 7/2004 |
| JP | 2004-259406 A | 9/2004 |
| JP | 2005-288972 | 10/2005 |
| JP | 2008-016074 | 1/2008 |

OTHER PUBLICATIONS

Explanation of Non-English Language References, Sep. 16, 2004.

(Continued)

*Primary Examiner*—Jason C Olson
*Assistant Examiner*—Henok Heyi
(74) *Attorney, Agent, or Firm*—Knobbe Martens Olson & Bear LLP

(57) ABSTRACT

According to one embodiment, a write-once information recording medium includes a transparent resin substrate having concentric or spiral grooves and lands, and a recording film formed on the grooves and lands of the transparent resin substrate, wherein the recording film includes an organic dye layer containing a metal complex monomer and a metal complex polymer, a recording mark is formed in the organic dye layer by emission of a short-wavelength laser beam, and a light reflectance of the recording mark formed by emission of the short-wavelength laser beam is higher than that before emission of the short-wavelength laser beam, and the grooves wobble within a predetermined amplitude range.

4 Claims, 9 Drawing Sheets

OTHER PUBLICATIONS

Final Notice of Rejection for the Japanese patent application No. 2008-021906 mailed by Japan Patent Office on Jul. 28, 2009.
Combined Search and Examination Report issued by the U.K. Intellectual Property Office on Jan. 30, 2009.

Examination Report under Section 18(3) issued by United Kingdom Intellectual Property Office on Apr. 21, 2010 in the corresponding UK patent application No. GB0823169.8.

* cited by examiner

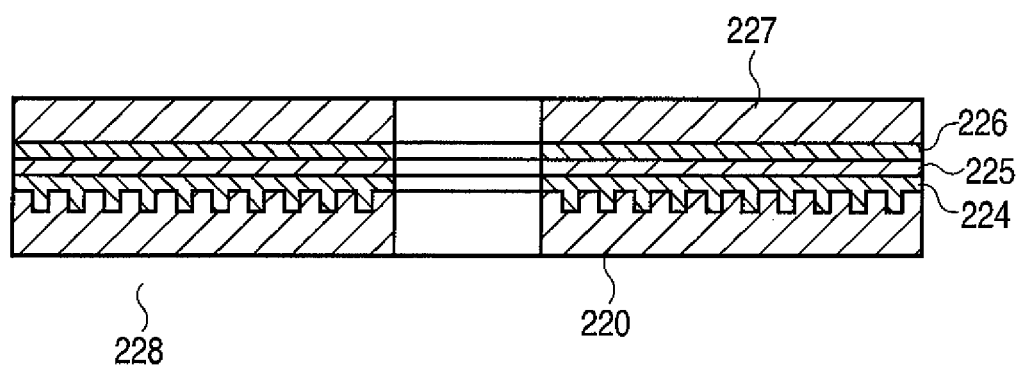
F I G. 1
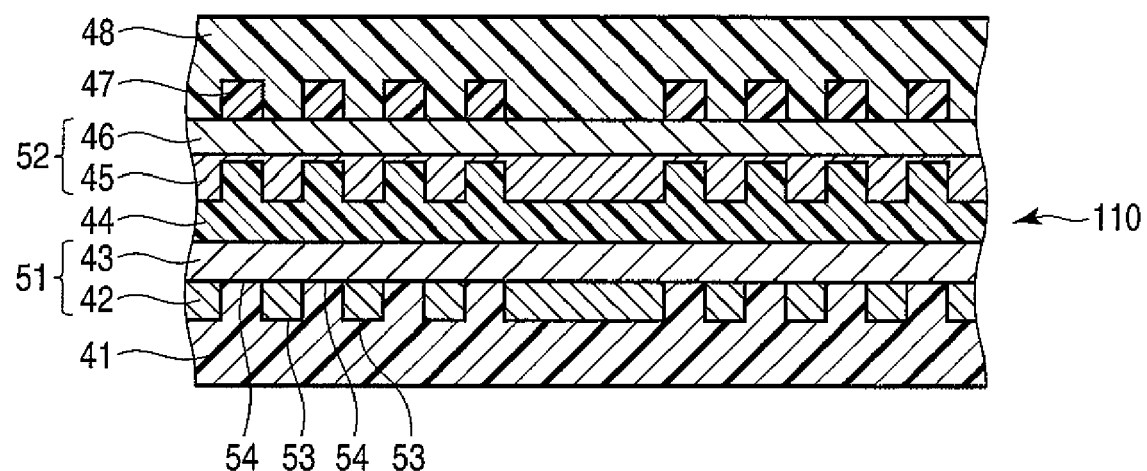
F I G. 2

# US 7,885,173 B2

WRITE-ONCE INFORMATION RECORDING MEDIUM AND DISK APPARATUS

CROSS-REFERENCE TO RELATED APPLICATIONS

This application is based upon and claims the benefit of priority from Japanese Patent Application No. 2008-021906, filed Jan. 31, 2008, the entire contents of which are incorporated herein by reference.

BACKGROUND

1. Field

The present invention relates to a write-once information recording medium capable of recording and reproducing information by using a short-wavelength laser beam such as a blue laser beam, and a display apparatus for playing back the medium.

2. Description of the Related Art

As is well known, the recent spread of personal computers and the like is increasing the importance of digital data storage media. For example, information recording media capable of digital recording and reproduction of long-time video information and audio information are presently widespread. Also, information recording media for digital recording and reproduction are beginning to be used in mobile apparatuses such as cell phones.

Many information recording media of this type have disk shapes because disks have a large information recording capacity and a high random accessibility which allows rapid retrieval of desired recorded information. In addition, disks can be easily stored and carried because they are compact and light in weight, and they are also inexpensive.

Presently, so-called optical disks capable of recording and reproducing information in a non-contact state by emission of a laser beam are most frequently used as disk-like information recording media. These optical disks mainly comply with the CD (Compact Disk) standards or DVD (Digital Versatile Disk) standards, and these two standards have compatibility.

The optical disks are classified into three types: read-only optical disks incapable of information recording such as a CD-DA (Digital Audio), CD-ROM (Read-Only Memory), DVD-V (Video), and DVD-ROM; write-once optical disks capable of writing information once such as a CD-R (Recordable) and DVD-R; and rewritable optical disks capable of rewriting information any number of times such as a CD-RW (ReWritable) and DVD-RW.

Of the optical disks capable of recording, the write-once optical disks using organic dyes in recording layers are most popular because the manufacturing cost is low. This is so because users rarely rewrite recorded information with new information when an information recording volume exceeds 700 MB (Mega Bytes), so it is practically only necessary to record information just once.

As the volume of information increases, demands have arisen for increasing the capacity and transfer rate of optical disks. The presently commercially available optical disks are CDs, DVDs, and the like. To meet the market demand for shortening the recording time of a recordable optical disk, the transfer rate of, e.g., a CD-R has been increased to 48×, and that of, e.g., a DVD-R has been increased to 16×.

To further increase the capacity of an optical disk, an optical disk called an HD DVD has been developed. The data capacity of one side of an HD DVD-ROM or HD DVD-R is 15 GB that is three times or more the data capacity of the conventional DVD, i.e., 4.7 GB. An organic dye material is used in a recording layer of this HD DVD-R as described in, e.g., Jpn. Pat. Appln. KOKAI Publication No. 2003-308630 (e.g., patent reference 1).

Unfortunately, this HD DVD is capable of recording at only a standard velocity.

If data is recorded at a high linear velocity on the HD DVD-R disk capable of standard-velocity recording, the recording signal characteristics significantly deteriorate even at, e.g., 2×. That is, the characteristics of the present recording layers make high-linear-velocity recording difficult.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view showing the sectional structure of an example of a write-once information recording medium according to the present invention;

FIG. 2 is an exemplary view showing the sectional structure of another example of the write-once information recording medium according to the present invention;

DETAILED DESCRIPTION

Figure 3A:
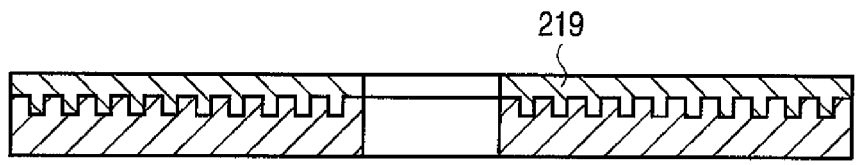
FIGS. 3A to 3F are exemplary views showing the procedure of an example of a write-once information recording medium manufacturing method.

Various embodiments according to the invention will be described hereinafter with reference to the accompanying drawings. In general, a write-once information recording medium according to one embodiment of the invention, that comprises a transparent resin substrate having concentric or spiral grooves and lands, and a recording film having an organic dye layer formed on the grooves and lands of the transparent resin substrate, and a reflecting layer formed on the organic dye layer, wherein a recording mark is formed in the recording film by emission of a short-wavelength laser beam, the light reflectance of the recording mark formed by emission of the short-wavelength laser beam is higher than that before emission of the short-wavelength laser beam, and the grooves wobble within a predetermined amplitude range.

As the recording film, it is possible to form two or more layers of a combination of the organic dye layer and reflecting layer.

A write-once information recording medium according to another embodiment of the present invention has a recording film in which multiple layers are thus stacked, and comprises a transparent resin substrate having concentric or spiral grooves and lands, a first recording film formed on the grooves and lands of the transparent resin substrate, an interlayer formed on the first recording film and made of a transparent resin material having concentric or spiral grooves and lands, and a second recording film formed on the grooves and lands of the interlayer, wherein at least one of the first recording film and the second recording film includes an organic dye layer containing a metal complex monomer and a metal complex polymer, a recording mark is formed in each of the first recording film and the second recording film by emission of a short-wavelength laser beam, the light reflectance of the recording mark formed by emission of the short-wavelength laser beam is higher than that before emission of the short-wavelength laser beam in each of the first recording film and the second recording film, and the grooves wobble within a predetermined amplitude range.

A write-once information recording medium of the present invention comprises a transparent resin substrate having concentric or spiral grooves and lands, and a recording film having an organic dye layer formed on the grooves and lands of the transparent resin substrate, and a reflecting layer formed on the organic dye layer, wherein a recording mark is formed in the recording film by emission of a short-wavelength laser beam, the light reflectance of the recording mark formed by emission of the short-wavelength laser beam is higher than that before emission of the short-wavelength laser beam, and the grooves wobble within a predetermined amplitude range.

As the recording film, it is possible to form two or more layers of a combination of the organic dye layer and reflecting layer.

A write-once information recording medium according to another aspect of the present invention has a recording film in which multiple layers are thus stacked, and comprises a transparent resin substrate having concentric or spiral grooves and lands, a first recording film formed on the grooves and lands of the transparent resin substrate, an interlayer formed on the first recording film and made of a transparent resin material having concentric or spiral grooves and lands, and a second recording film formed on the grooves and lands of the interlayer, wherein at least one of the first recording film and the second recording film includes an organic dye layer containing a metal complex monomer and a metal complex polymer, a recording mark is formed in each of the first recording film and the second recording film by emission of a short-wavelength laser beam, the light reflectance of the recording mark formed by emission of the short-wavelength laser beam is higher than that before emission of the short-wavelength laser beam in each of the first recording film and the second recording film, and the grooves wobble within a predetermined amplitude range.

The present invention will be explained in more detail below with reference to the accompanying drawing.

FIG. 1 is a sectional view showing the structure of an example of the write-once information recording medium of the present invention.

A write-once optical disk 228 has a structure in which an organic dye layer 224, a silver alloy layer 225 containing 1% of Ga (gallium) and 1% of copper, and an ultraviolet-curing resin layer 226 are sequentially stacked on a transparent disk substrate 220 made of 0.6-mm thick polycarbonate and having land and groove patterns, and a disk substrate 227 made of 0.6-mm thick polycarbonate is formed on the ultraviolet-curing resin layer 26.

FIG. 2 is an exemplary view showing the sectional structure of an example of the write-once information recording medium according to the present invention.

As shown in FIG. 2, a double-layered write-once information recording medium 110 comprises, on a first substrate 41 made of a transparent resin having concentric or spiral grooves and lands, a first recording film 51 formed on grooves 53 and lands 54 of the first substrate 41, an interlayer 44 made of a transparent resin material such as an ultraviolet-curing resin having concentric or spiral grooves 53 and lands 54, and a second recording film 52 formed on the grooves 53 and lands 54 of the interlayer 44.

The first recording film 51 comprises a first organic dye layer 42 formed on the grooves 53 and lands 54 of the transparent resin substrate 41, and a semitransparent layer 43 formed on the first organic dye layer 42 and made of, e.g., a silver alloy. The second recording layer 52 comprises a second organic dye layer 45 formed on the interlayer 44, and a reflecting layer 46 made of, e.g., a silver alloy.

Each of the first and second organic dye layers is made of a mixture of a metal complex monomer and metal complex polymer.

Also, a second substrate 48 made of a transparent resin or the like is formed on the silver alloy reflecting layer 46 with an adhesive layer 47 between them.

A method of manufacturing a single-layered write-once information recording medium of the present invention will be described below.

A disk stamper 219 having groove and land patterns is preformed.

Figure 3B:
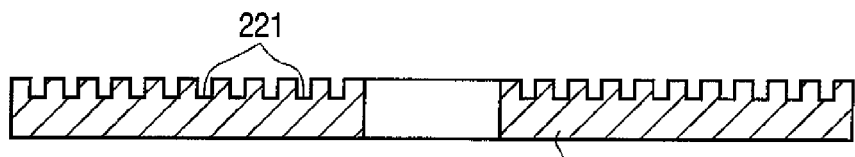

As shown in FIG. 3A, the disk stamper 219 is used to perform injection molding by the SD40 injection molding apparatus manufactured by Sumitomo Heavy Industries, thereby duplicating a transparent disk substrate 220 made of 0.6-mm thick polycarbonate as shown in FIG. 3B. Grooves 221 are naturally formed on the disk substrate 220.

Figure 3C:
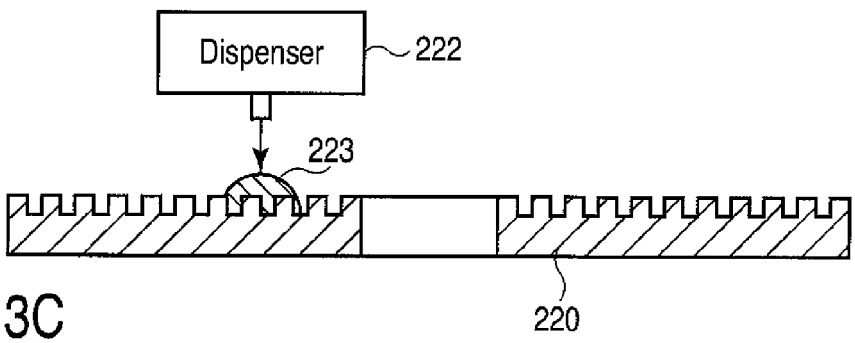
Figure 3D:
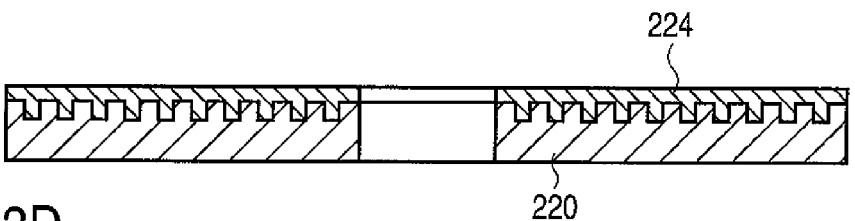

After that, as shown in FIG. 3C, a dispenser 222 having a nozzle diameter of 21 G is used to drop an organic dye solution 223 (to be described later) prepared by dissolving an organic dye in a solvent, on the surface of the disk substrate 220 on which the grooves 221 are formed. Then, as shown in FIG. 3D, the rotation of the disk substrate 220 is controlled such that the organic dye solution 223 fills the grooves 221, thereby forming a recording film 224.

The spin-coating conditions of the recording film 224 are as follows. First, the disk substrate 220 standing still is rotated to 300 rpm over 1 sec, and the dispenser 222 applies the organic dye solution 223 while the disk substrate 222 is held in this state for 8 sec. Then, the rotational speed of the disk substrate 220 is raised to 1,800 rpm over 2 sec, and the disk substrate 220 is held in this state for 15 sec. After that, the rotational speed of the disk substrate 220 is raised to 3,000 rpm over 2 sec, and the disk substrate 220 is held in this state for 3 sec.

The film thickness of the recording film 224 can be controlled by controlling the rotational speed in the second stage. That is, the film thickness of the recording firm 224 can be increased by decreasing the rotational speed in the second stage.

Figure 3E:
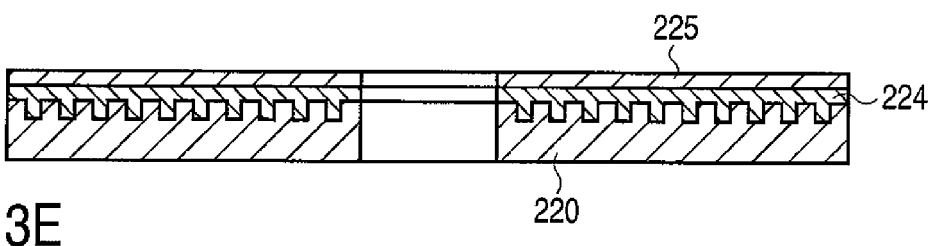

Subsequently, the disk substrate 220 coated with the recording film 224 is baked in a clean oven at 80° C. for 30 min, and a 100-nm thick metal film 225 is sputtered on the recording film 224 as shown in FIG. 3E. As the metal film 225, an Ag alloy containing 1% of Ga (gallium) and 1% of Cu is used. However, it is also possible to use pure silver or an AgBi alloy.

Figure 3F:
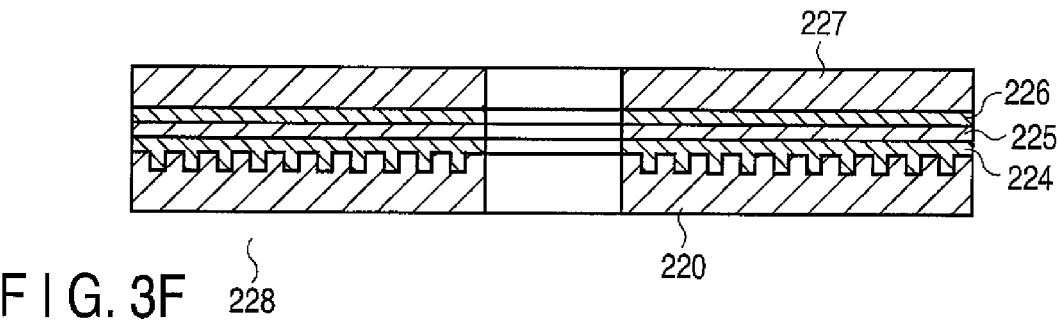

After that, as shown in FIG. 3F, an ultraviolet-curing resin 226 is formed on the metal film 225 by spin coating, and a disk substrate 227 made of 0.6-mm thick polycarbonate is adhered, thereby forming a write-once optical disk (R disk) 228 containing the organic dye in the recording film 224.

A method of manufacturing a double-layered write-once information recording medium of the present invention will be described below.

Figure 4:
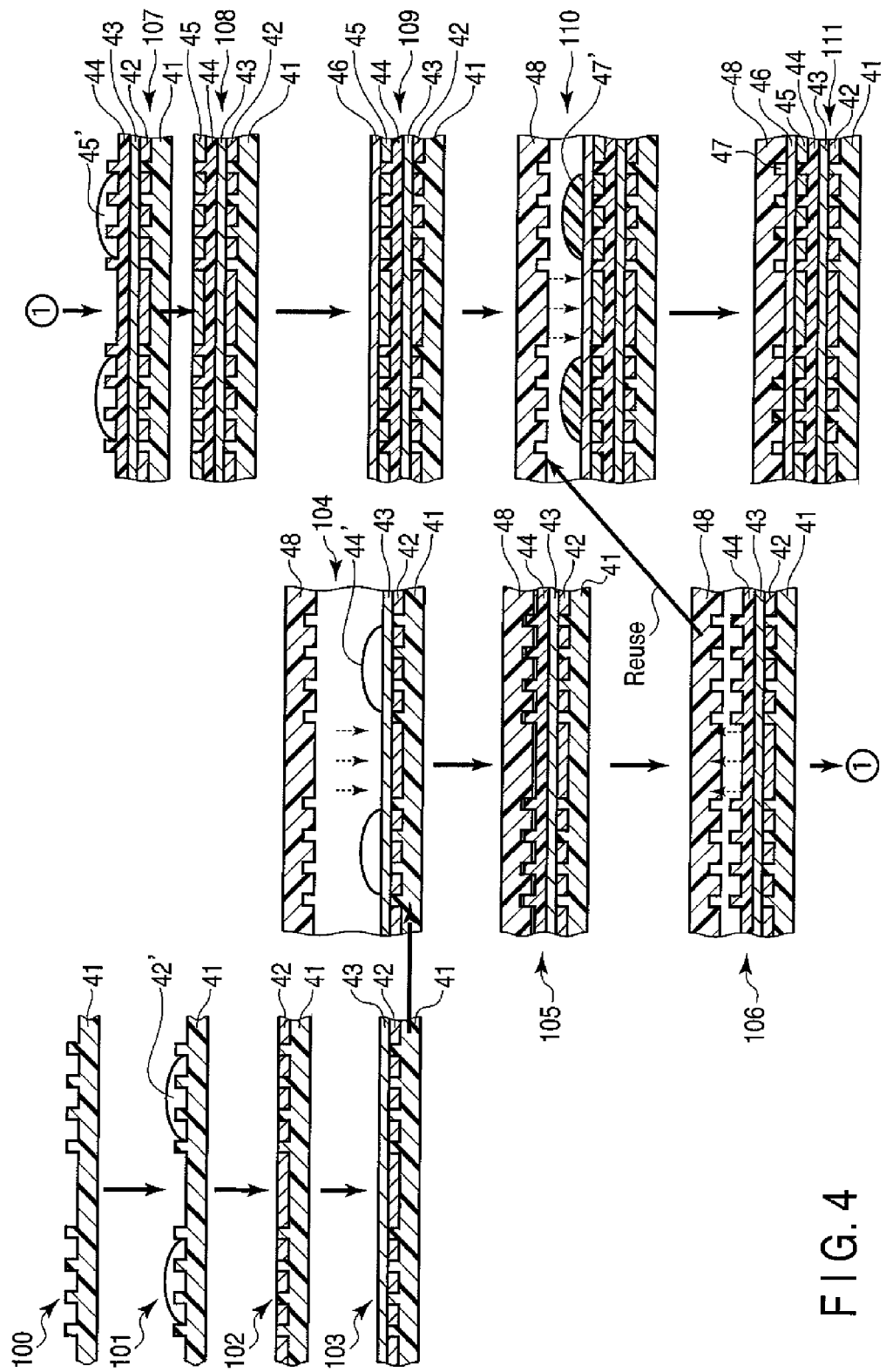
FIG. 4 is an exemplary view showing the procedure of an example of a write-once information recording medium manufacturing method.

FIG. 4 is an exemplary view showing the procedure of a method of manufacturing an example of the double-layered write-once information recording medium described above.

Reference numerals 100 to 111 in FIG. 4 denote models for explaining the manufacturing steps of the example of the write-once information recording medium.

First, in a step denoted by 100, an L0 polycarbonate substrate 41 obtained by injection molding of an L0 Ni stamper obtained in a mastering step is prepared, in order to form a first recording film (L0) 51. An L0 organic dye material 42' is applied on the substrate 41 as indicated by 101, and spin-coated and dried as indicated by 102, thereby obtaining a first organic dye layer 42.

Then, in a step denoted by 103, a semitransparent layer 43 is formed by sputtering a silver alloy or the like, thereby obtaining a stack of the first organic dye layer 42 and semitransparent layer 43, as a first recording film (L0) 51, on the substrate 41.

Separately, a second recording film (L1) Ni stamper (mother stamper) obtained in a mastering step is injection-molded to prepare an L1 polycarbonate substrate 48.

An ultraviolet-curing resin 44' is applied as indicated by 104 on the semitransparent layer 43 of the stack obtained in the step denoted by 103, and spin-coated to form an ultraviolet-curing resin layer 44.

Subsequently, as indicated by 105, the L1 polycarbonate substrate 48 is pressed against the ultraviolet-curing resin layer 44 and temporarily adhered by ultraviolet radiation. Note that the spin conditions are adjusted to make the thickness of the ultraviolet-curing resin 441 uniform.

After that, as indicated by 106, the L1 polycarbonate substrate 48 is removed from the cured ultraviolet-curing resin layer 44.

Then, an L1 organic dye material 45' is applied, spin-coated, and dried on the surface of the ultraviolet-curing resin layer 44 as indicated by 107, thereby forming a second organic dye layer 45 as indicated by 108.

In addition, a reflecting layer 46 is formed by sputtering, e.g., a silver alloy as indicated by 109, thereby obtaining a second recording film (L1) having a stack of the second organic dye layer 45 and reflecting layer 46.

After that, an adhesive 47' is applied on the reflecting layer 46 as indicated by 110. Furthermore, the polycarbonate substrate 48 injection-molded as the L2 transfer stamper in the step denoted by 106 is adhered by an adhesive layer 47, thereby obtaining a double-layered write-once information recording medium having the structure denoted by 110.

Figure 5:
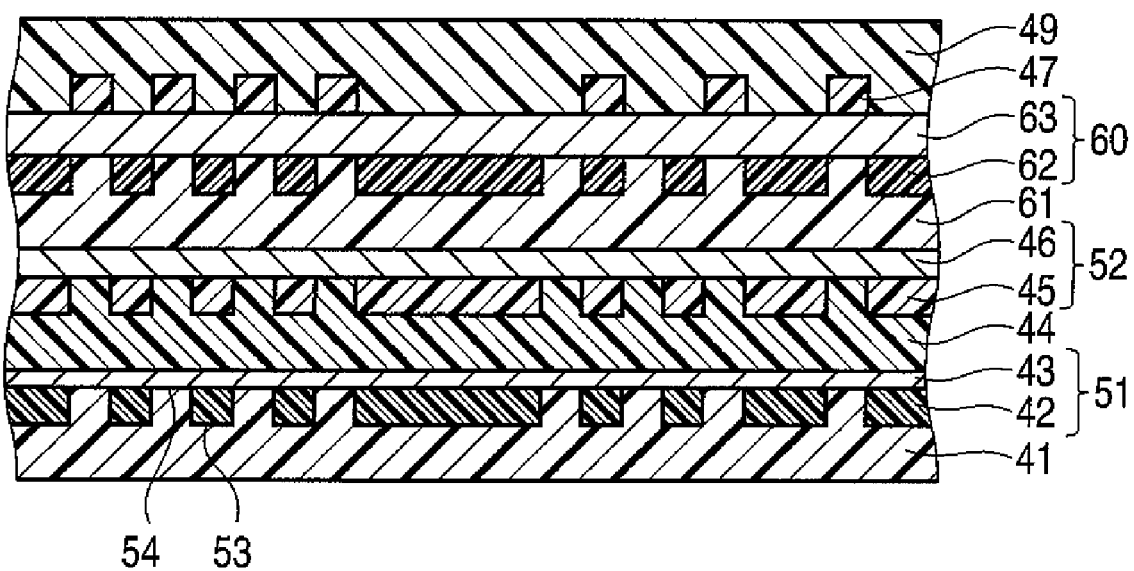
FIG. 5 is an exemplary view showing the sectional structure of an example of a write-once information recording medium according to the present invention.

FIG. 5 is an exemplary view showing the sectional structure of another example of the write-once information recording medium according to the present invention.

As shown in FIG. 5, this three-layered write-once information recording medium is represented by a model 117, and has the same structure as that shown in FIG. 1 except that a second substrate 49 is used instead of the second substrate 48, and a second interlayer 61 and a third recording layer 60 including a third organic dye layer 62 and a reflecting layer 63 made of, e.g., a silver alloy are formed between a silver alloy reflecting layer 46 and a layer including an adhesive layer 47 and the second substrate 49.

Figure 6:
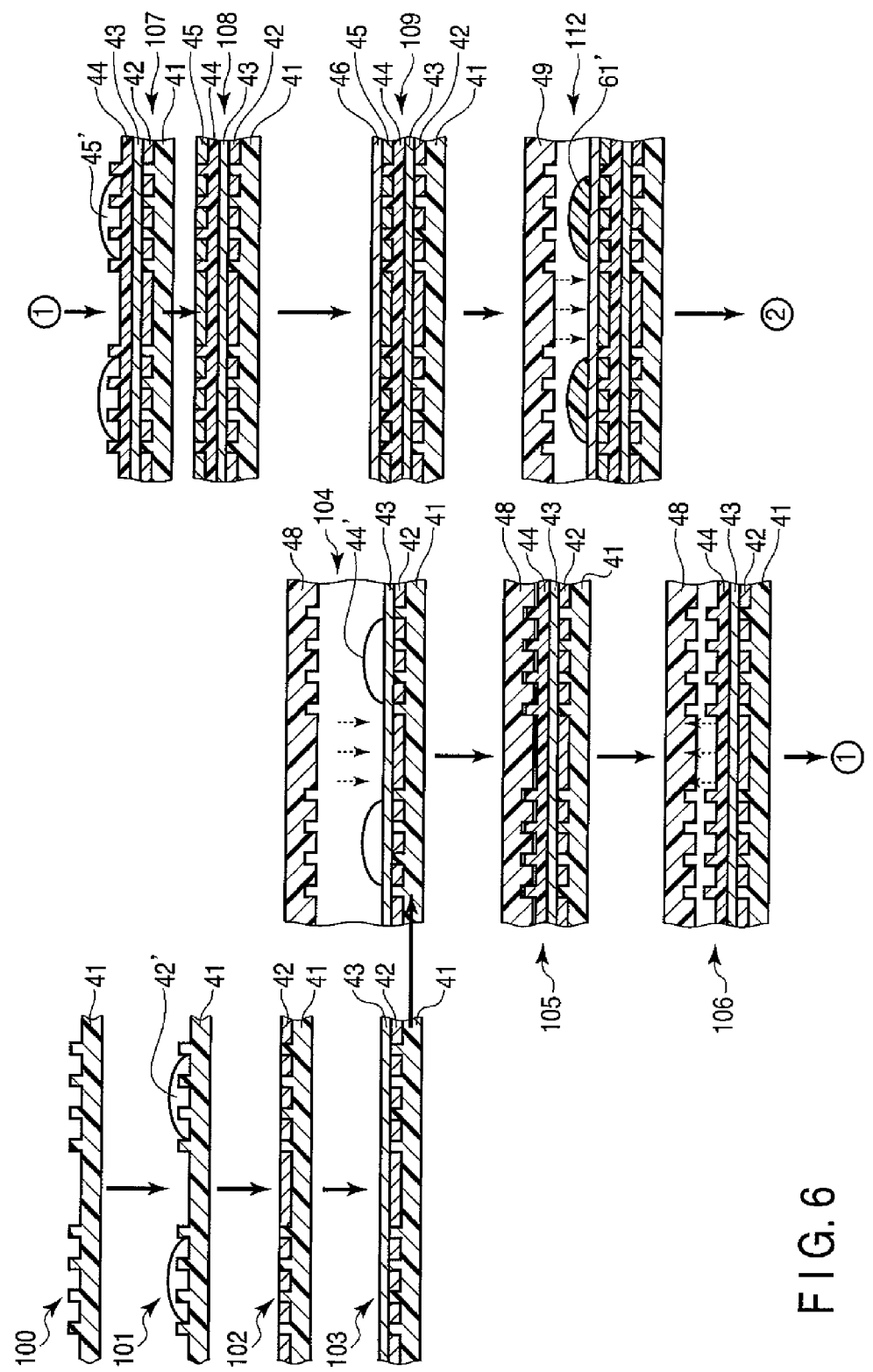
FIG. 6 is an exemplary view showing the procedure of an example of a write-once information recording medium manufacturing method.
Figure 7:
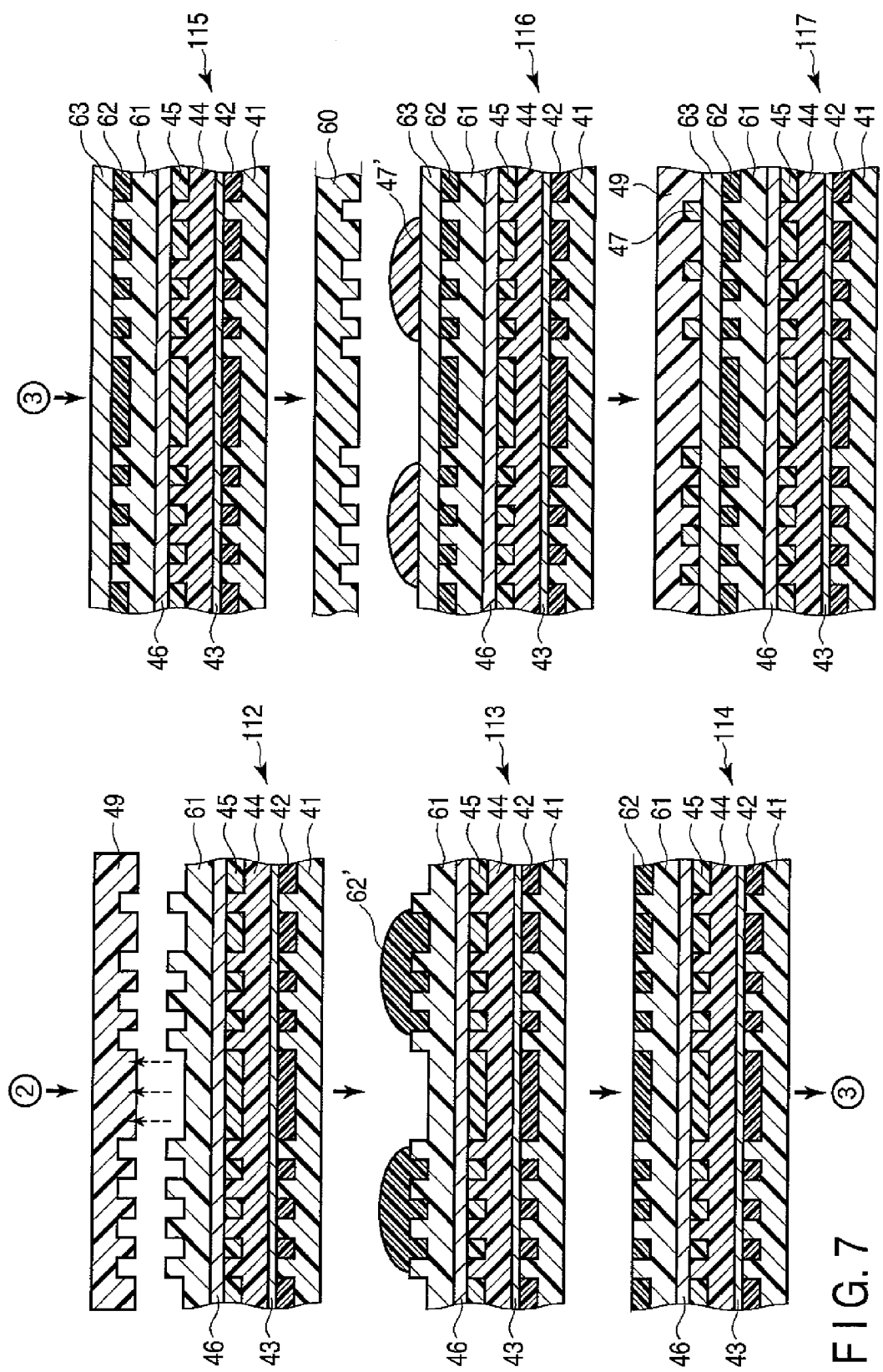
FIG. 7 is an exemplary view showing the procedure of an example of a write-once information recording medium manufacturing method.

FIGS. 6 and 7 are exemplary views showing the procedure of a method of manufacturing the three-layered write-once information recording medium 117 shown in FIG. 5.

Reference numerals 100 to 109 and 112 to 117 shown in FIGS. 6 and 7 are models for explaining the manufacturing steps of an example of the three-layered write-once information recording medium.

As shown in FIG. 6, those manufacturing steps of the three-layered write-once information recording medium which are represented by the models 100 to 109 are the same as those shown in FIG. 4. After that, an ultraviolet-curing resin 61 is applied instead of an adhesive on the reflecting layer 46. An L2 polycarbonate substrate 49 injection-molded as an L2 transfer stamper is pressed against the ultraviolet-curing resin 61' as indicated by 112, and temporarily adhered by ultraviolet radiation. Note that the spin conditions are adjusted so as to make the thickness of the ultraviolet-curing resin 61' uniform.

After that, as indicated by 112, the L2 polycarbonate substrate 49 is removed from a cured ultraviolet-curing resin layer 61.

Then, as indicated by 113, an L2 organic dye material 62' is applied on the surface of the ultraviolet-curing resin layer 61, and spin-coated and dried, thereby forming a second organic dye layer 62 as indicated by 114.

In addition, as indicated by 115, a reflecting layer 63 is formed by sputtering a silver alloy or the like, thereby forming a third recording film (L2) having the stack of the third organic dye layer 62 and reflecting layer 63.

Subsequently, as indicated by 116, an adhesive 47' is applied on the reflecting layer 63. Furthermore, the polycarbonate substrate 49 molded as an L2 transfer stamper in, e.g., the step indicated by 112 is adhered by an adhesive layer 47, thereby obtaining a three-layered write-once information recording medium having the structure represented by 117.

In the present invention, the organic dye compound used in the organic dye layer is a mixture of a metal complex monomer and metal complex polymer.

According to an aspect of the present invention, an organic dye compound having a structure in which two constituent units each represented by formula (1) below are arranged for one central metal can be used as the metal complex monomer.

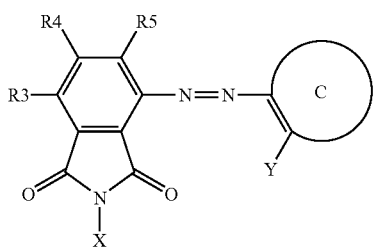

(1)

Examples of a substituent group (X) added to the end of N of phthalimide forming a ligand of the azo metal complex monomer described above are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Three substituent groups (R3, R4, and R5) added to phthalimide forming another ligand of the azo metal complex monomer can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Y can be a group having active hydrogen.

Practical examples are groups having active hydrogen such as —SH, —SO$_2$H, —SO$_3$H, —NH$_2$, —NHR, —OH, —COOH, —B(OH)$_2$, —PO(OH)$_2$, —NHCOH, —NHCOR, and NHSOR. According to an aspect of the present invention, it is possible to use —NH, —NHR, or —OH. R represents an alkyl group or phenyl group such as a methyl group, ethyl group, propyl group, isopropyl group, butyl group, pentyl group, or hexyl group. These groups may also be substituted by a halogen group such as a fluorine atom, chlorine atom, or bromine atom.

Examples of the central metal are Mg, Al, Sc, Ti, V, Cr, Mn, Fe, Co, Ni, Cu, Zn, Zr, Ru, Rh, Pd, In, Sn, Hf, Os, Pt, Au, Ag, Ta, W, Mo, and Y. According to an aspect of the present invention, it is possible to use, e.g., Ni, Co, Cu, Al, Fe, or Y. According to another aspect of the present invention, Cu can be used.

The two constituent units represented by formula (1) can be identical structures (symmetric ligand structures or homo complex structures), or different structures (asymmetric ligand structures or hetero complex structures).

A ring C represents a hydrocarbon ring that may have a substituent group, or a heterocyclic ring that may have a substituent group.

As the ring C, it is possible to use substituent groups represented by formulas (C-1) to (C-8) below.

(C-1)

(C-2)

(C-3)

(C-4)

(C-5)

(C-6)

(C-7)

-continued

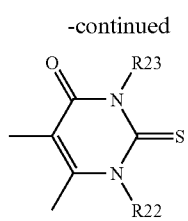
(C-8)

R6 to R23 can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthalimide group, and a barbituric acid group.

According to an aspect of the present invention, an example of the metal complex monomer represented by formula (1) is an organic dye compound represented by formula (1-0) below.

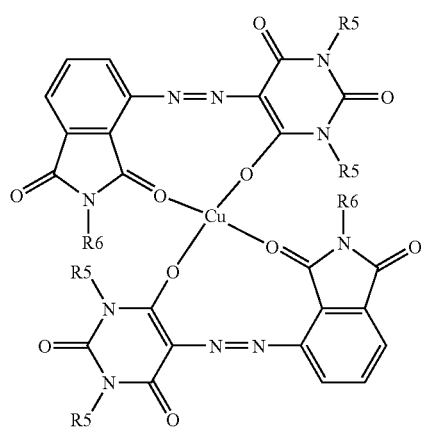
(1-0)

Examples of a substituent group (R6) added to the end of N of phthalimide forming a ligand of the azo metal complex monomer described above are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Two substituent groups (R5) added to the ends of Ns of barbituric acid forming another ligand of the azo metal complex monomer can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Examples of the central metal are Mg, Al, Sc, Ti, V, Cr, Mn, Fe, Co, Ni, Cu, Zn, Zr, Ru, Rh, Pd, In, Sn, Hf, Os, Pt, Au, Ag, Ta, W, Mo, and Y. According to an aspect of the present invention, it is possible to use Ni, Co, Cu, Al, Fe, or Y. According to another aspect of the present invention, Cu can be used.

Formula (1-0) has two constituent units for one central metal. These constituent units can be identical structures (symmetric ligand structures or homo complex structures), or different structures (asymmetric ligand structures or hetero complex structures).

Examples of the organic dye compound represented by formula (1-0) are indicated by, e.g., formulas (1-1), (1-2), (1-3), (1-4), and (1-5) below.

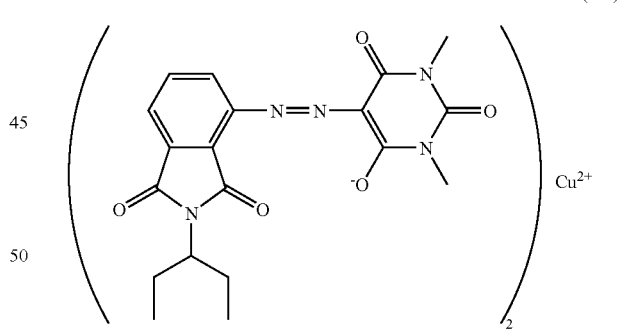

(1-3)
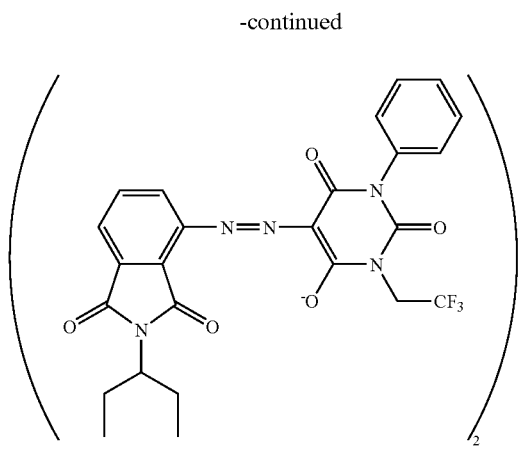
(1-4)
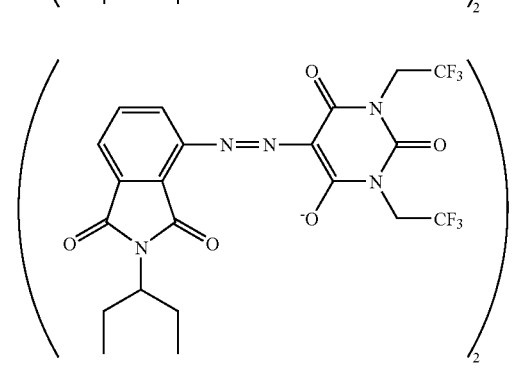
(1-5)
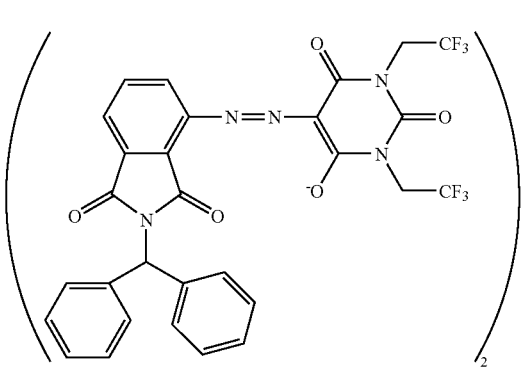
Other examples of the metal complex monomer represented by formula (1) are organic dye compounds represented by formulas (2-1), (2-2), (2-3), (2-4), and (2-5) below.
(2-1)
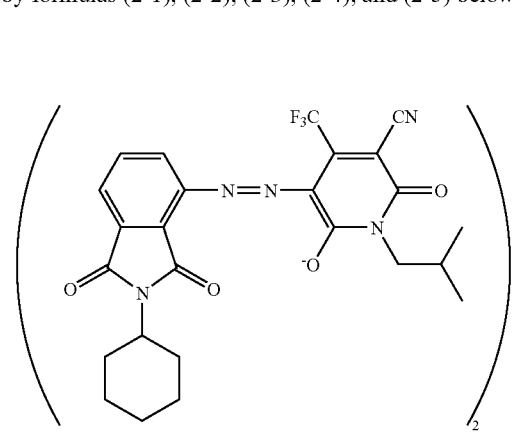
(2-2)
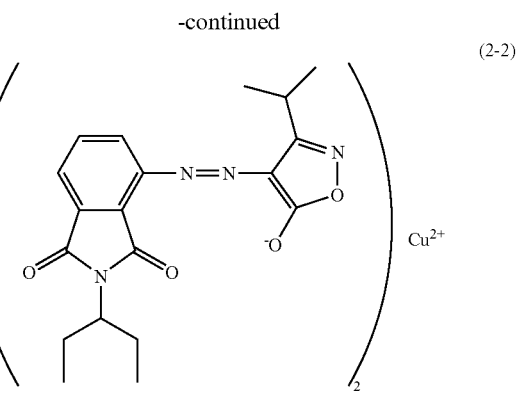
(2-3)
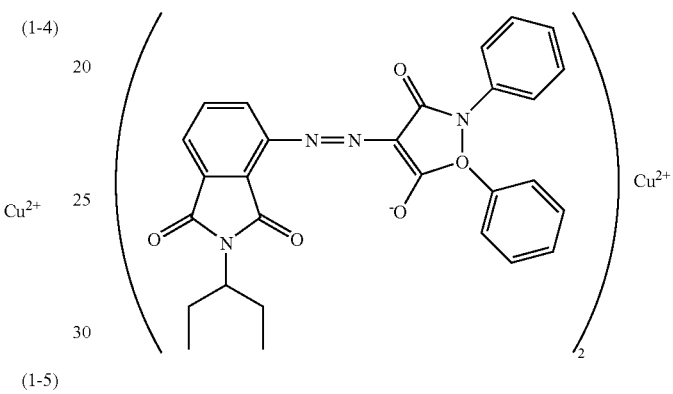
(2-4)
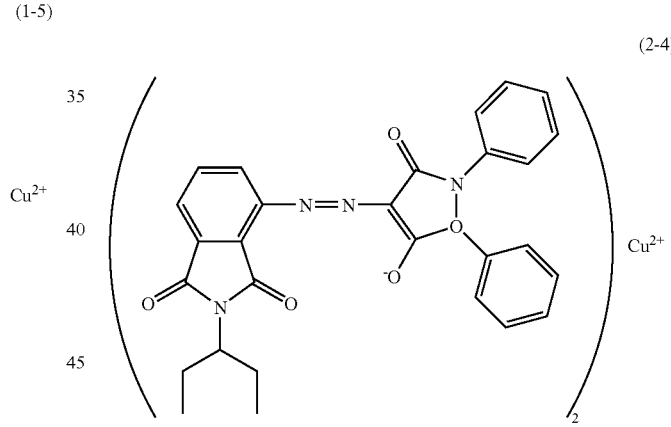
(2-5)
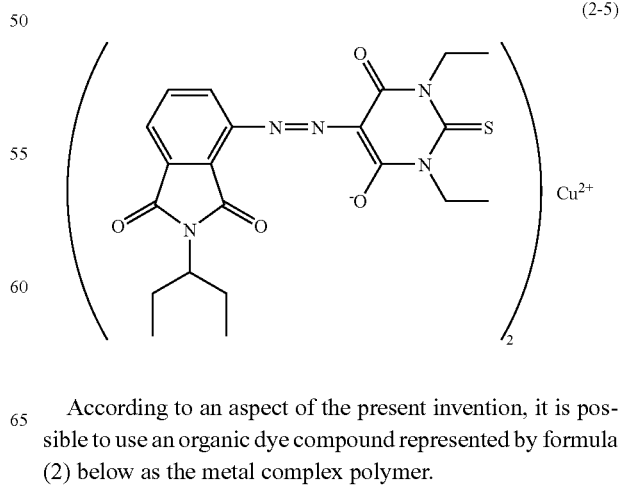
According to an aspect of the present invention, it is possible to use an organic dye compound represented by formula (2) below as the metal complex polymer.

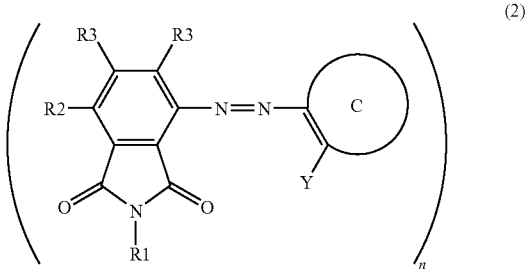

(2)

Examples of a substituent group (R1) added to the end of N of phthalimide forming a ligand of the azo metal complex polymer described above are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Three substituent groups (R2, R3, and R4) added to phthalimide forming another ligand of the azo metal complex polymer can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Y represents a group having active hydrogen.

Practical examples are groups having active hydrogen such as —SH, —SO$_2$H, —SO$_3$H, —NH$_2$, —NHR, —OH, —COCH, —B(OH)$_2$, —PO(OH)$_2$, —NHCOH, —NHCOR, and NHSOR. According to an aspect of the present invention, it is possible to use —NH, —NHR, or —OH. R represents an alkyl group or phenyl group such as a methyl group, ethyl group, propyl group, isopropyl group, butyl group, pentyl group, or hexyl group. These groups may also be substituted by a halogen group such as a fluorine atom, chlorine atom, or bromine atom.

Examples of the central metal are Mg, Al, Sc, Ti, V, Cr, Mn, Fe, Co, Ni, Cu, Zn, Zr, Ru, Rh, Pd, In, Sn, Hf, Os, Pt, Au, Ag, Ta, W, Mo, and Y. According to an aspect of the present invention, it is possible to use Ni, Co, Cu, Al, Fe, or Y. According to another aspect of the present invention, Cu can be used.

Note that the number of formulas (2) is n for n central metals. That is, formula (2) represents an n-mer. Therefore, the number of central metals is two if n is 2, three if n is 3, four if n is 4, five if n is 5, and six if n is 6.

A ring C represents a hydrocarbon ring that may have a substituent group, or a heterocyclic ring that may have a substituent group.

As the ring C, it is possible to use formulas (C-1) to (C-8) presented earlier.

n is 2 to 6.

According to another aspect of the present invention, examples of the organic dye compound represented by formula (2) are organic dye compounds represented by formulas (3) and (4) below.

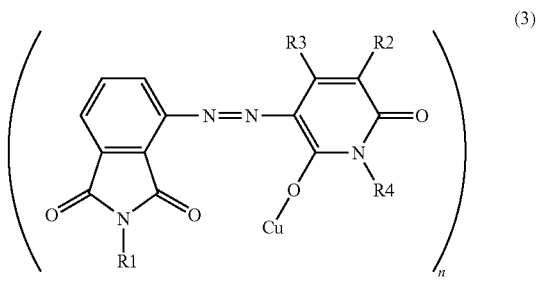

(3)

Examples of a substituent group (R1) added to the end of N of phthalimide forming a ligand of the azo metal complex polymer described above are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

A substituent group (R4) added to the end of N of barbituric acid forming another ligand of the azo metal complex polymer and substituent groups (R2 and R3) can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Examples of the central metal are Mg, Al, Sc, Ti, V, Cr, Mn, Fe, Co, Ni, Cu, Zn, Zr, Ru, Rh, Pd, In, Sn, Hf, Os, Pt, Au, Ag, Ta, W, Mo, and Y. According to an aspect of the present invention, it is possible to use Ni, Co, Cu, Al, Fe, or Y. According to another aspect of the present invention, Cu can be used.

The number n indicating a polymer can be 2 to 6.

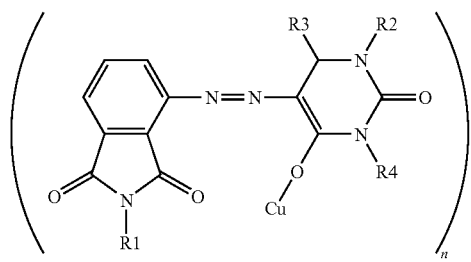

(4)

Examples of a substituent group (R1) added to the end of N of phthalimide forming a ligand of the azo metal complex polymer described above are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Two substituent groups (R2 and R4) added to the ends of Ns of barbituric acid forming another ligand of the azo metal complex monomer can be the same group or different groups. Examples are groups having a hydrogen atom, halogen atoms such as a fluorine atom, chlorine atom, and bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group.

Examples of the central metal are Mg, Al, Sc, Ti, V, Cr, Mn, Fe, Co, Ni, Cu, Zn, Zr, Ru, Rh, Pd, In, Sn, Hf, Os, Pt, Au, Ag, Ta, W, Mo, and Y. According to an aspect of the present invention, it is possible to use, e.g., Ni, Co, Cu, Al, Fe, or Y. According to another aspect of the present invention, Cu can be used. An oxygen atom or sulfur atom can be used as a substituent group R3. The number n indicating a polymer can be 2 to 6.

An example of the polymer represented by formula (3) above is an organic dye compound represented by formula ($\alpha$) below.

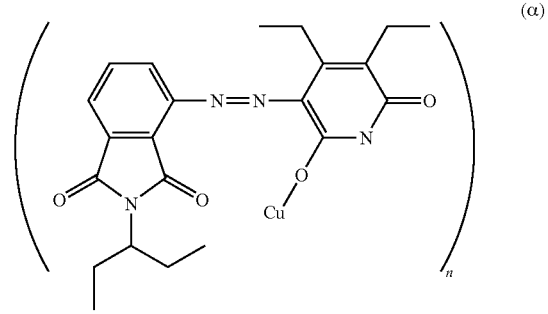

($\alpha$)

Practical examples can be represented by formulas ($\alpha$2) to ($\alpha$6) below.

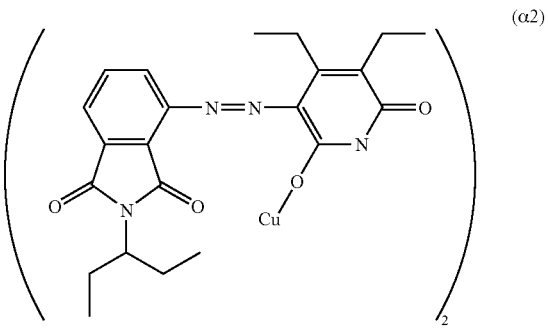

($\alpha$2)

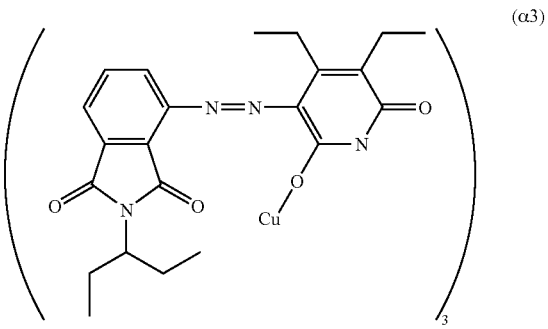

($\alpha$3)

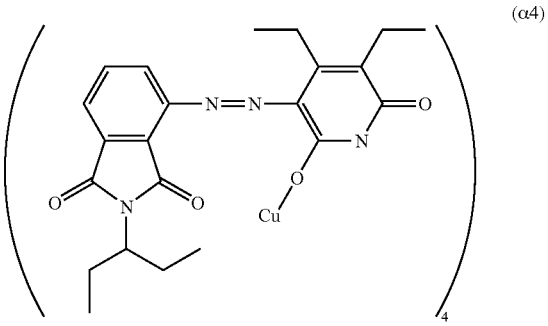

($\alpha$4)

-continued

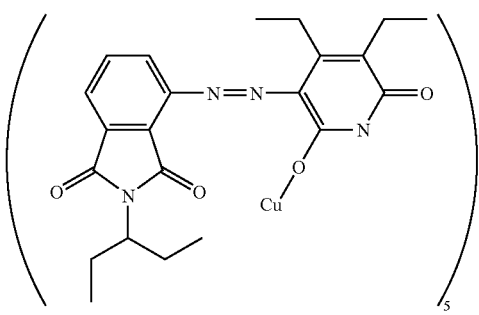
(α5)

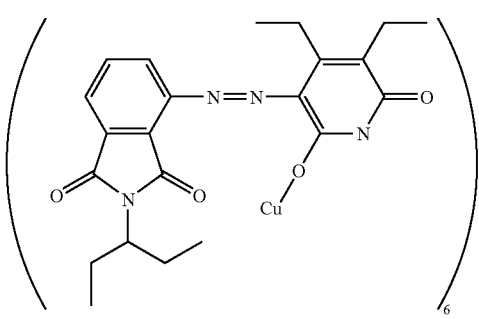
(α6)

An example of the polymer represented by formula (4) above is an organic dye compound represented by formula (β) below.

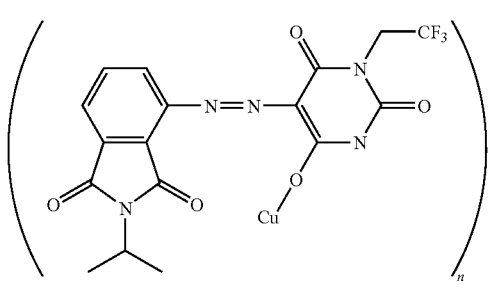
(β)

Practical examples can be represented by formulas (β2) to (β6) below.

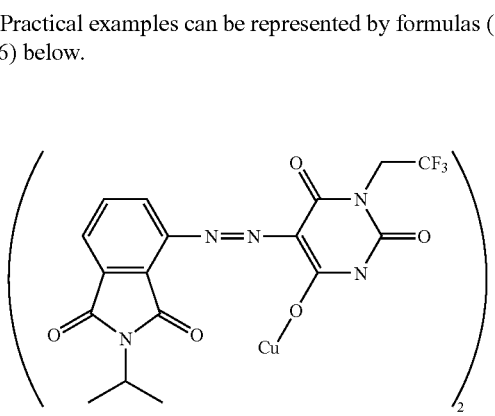
(β2)

-continued

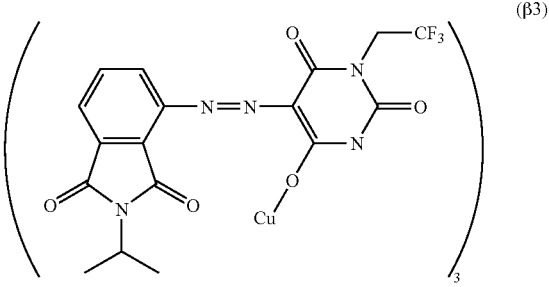
(β3)

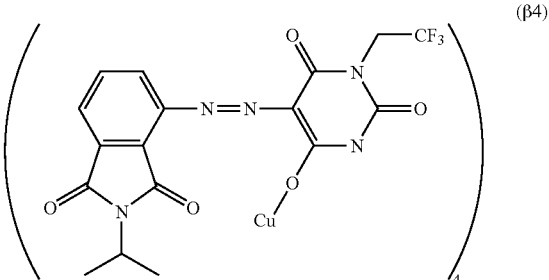
(β4)

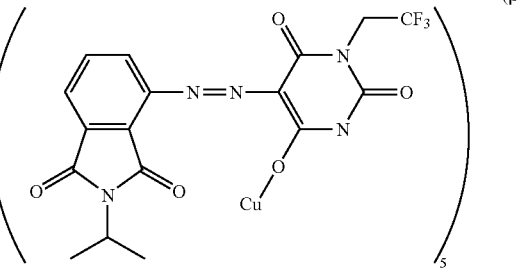
(β5)

(β6)

In the present invention, a material that removes easily from the polycarbonate substrate and sticks to the Ag layer or Ag alloy layer can be used as the ultraviolet-curing resin. The use of this ultraviolet-curing resin facilitates transferring the land and groove patterns of L1 to the ultraviolet-curing resin layer 44.

It is only necessary to use one type of ultraviolet-curing resin as described above, and L1 and L2 can be molded without using any conventional vacuum bonding step. This simplifies the bonding step and the facility for the step.

In addition, this ultraviolet-curing resin removes easily from the polycarbonate substrate, so the substrate hardly warps. Consequently, a favorable write-once information recording medium having a push-pull signal modulation degree of 0.26 or more is obtained.

The push-pull signal modulation degree is preferably as large as possible. Also, the warpage (tilt angle) is preferably as small as possible.

The ultraviolet-curing resin usable in an embodiment of the present invention is a polymer material containing carbon, hydrogen, nitrogen, and oxygen as main components. The oxygen ratio in this polymer material can be 11 atm % or more.

The ultraviolet-curing resin containing carbon, hydrogen, nitrogen, and oxygen as main components and having an oxygen ratio of 11 atm % or more removes easily from the polycarbonate substrate and sticks to the Ag layer or Ag alloy layer. According to an aspect of the present invention, the oxygen ratio is 11 to 14 atm %.

The "main component" herein mentioned is an element having a relatively high atomic ratio among elements forming a polymer material. An example is an element having the highest atomic ratio or an atomic ratio close to the highest atomic ratio.

The ultraviolet-curing resin material used in the present invention is formed by mixing a monomer, oligomer, adhesive, and polymerization initiator. It is also possible to mix a plurality of types of monomers and a plurality of types of oligomer materials.

The following materials are used as the monomer material.
Acrylates
Bisphenol A-ethylene oxide modified diacrylate (BPEDA)
Dipentaerythritol hexa(penta)acrylate (DPEHA)
Dipentaerythritolmonohydroxy pentaacrylate (DPEHPA)
Dipropyleneglycol diacrylate (DPGDA)
Ethoxylated trimethylolpropane triacrylate (ETMPTA)
Glycerinpropoxy triacrylate (GPTA)
4-hydroxybutyl acrylate (HBA)
1,6-hexanediol diacrylate (HDDA)
2-hydroxyethyl acrylate (HEA)
2-hydroxypropyl acrylate (HPA)
Isobornyl acrylate (IBOA)
Polyethyleneglycol diacrylate (PEDA)
Pentaerythritol triacrylate (PETA)
Tetrahydrofulfuryl acrylate (THFA)
Trimethylolpropane triacrylate (TMPTA)
Tripropyleneglycol diacrylate (TPGDA)
Methacrylates
Tetraethyleneglycol dimethacrylate (TEDMA)
Alkyl methacrylate (AKMA)
Allyl methacrylate (AMA)
1,3-butyleneglycol dimethacrylate (BDMA)
n-butyl methacrylate (BMA)
Benzyl methacrylate (BZMA)
Cyclohexyl methacrylate (CHMA)
Diethyleneglycol dimethacrylate (DEGDMA).
2-ethylhexyl methacrylate (EHMA)
Glycidyl methacrylate (GMA)
1,6-hexanediol dimethacrylate (HDDMA)
2-hydroxyethyl methacrylate (2-HEMA)
Isobornyl methacrylate (IBMA)
Lauryl methacrylate (LMA)
Phenoxyethyl methacrylate (PEMA)
t-butyl methacrylate (TBMA)
Tetrahydrofurfuryl methacrylate (THFMA)
Trimethylolpropane trimethacrylate (TMPMA)

Particularly favorable examples are tricyclodecanedimethanol diacrylate (A-DCP) represented by formula (A1) below, isobornyl acrylate (IBOA) represented by formula (A2) below, tripropyleneglycol diacrylate (TPGDA) represented by formula (A3) below, dipropyleneglycol diacrylate (DPGDA) represented by formula (A4) below, neopentylglycol diacrylate (NPDA) represented by formula (A5) below, ethoxylated isocyanuric triacrylate (TITA) represented by formula (A6) below, 2-hydroxypropyl diacrylate (HPDA) represented by formula (A7) below, acetalglycol diacrylate (AGDA) represented by formula (A8) below, ditrimethylolpropane tetraacrylate (DTTA) represented by formula (A9) below, ethoxylated 2-mol bisphenol A dimethyl acrylate (EO2BDMA) represented by formula (A10) below, and ethoxylated 3-mol bisphenol A dimethyl acrylate (EO3BMA) represented by formula (A11) below.

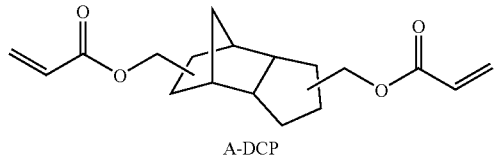

A-DCP (A1)

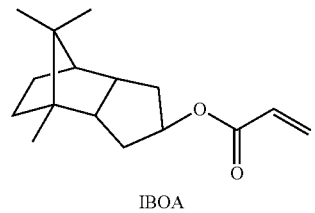

IBOA (A2)

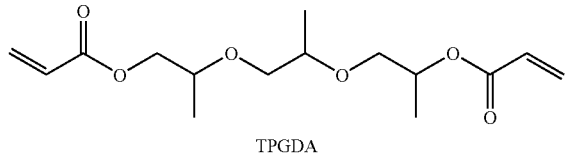

TPGDA (A3)

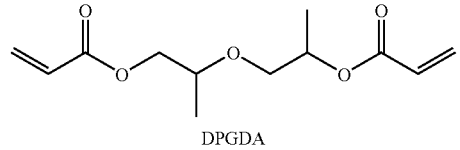

DPGDA (A4)

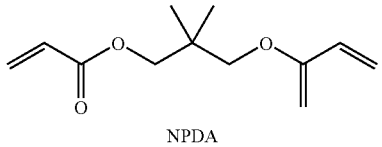

NPDA (A5)

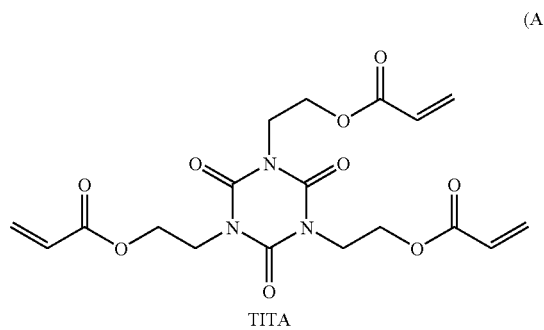

TITA

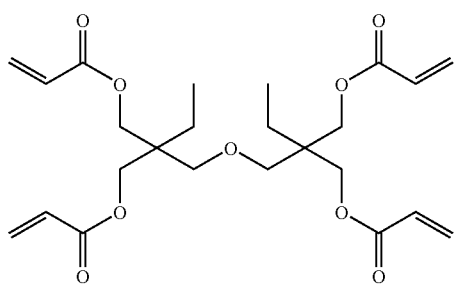

DTTA

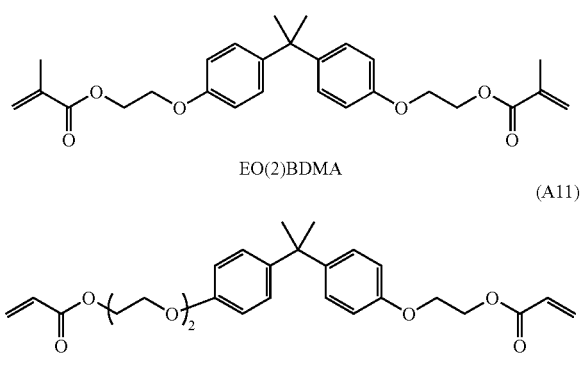

EO(2)BDMA

EO(3)BMA

HPDA

AGDA

As the oligomer material, it is possible to use a urethane acrylate-based material represented by formula (B1) below, e.g., polyurethane diacrylate (PUDA), or polyurethane hexaacrylate (PUHA) represented by formula (B2) below. Other examples are polymethyl methacrylate (PMMA), polymethyl methacrylate fluoride (PMMA-F), polycarbonate diacrylate, and methyl methacrylate polycarbonate fluoride (PMMA-PC-F).

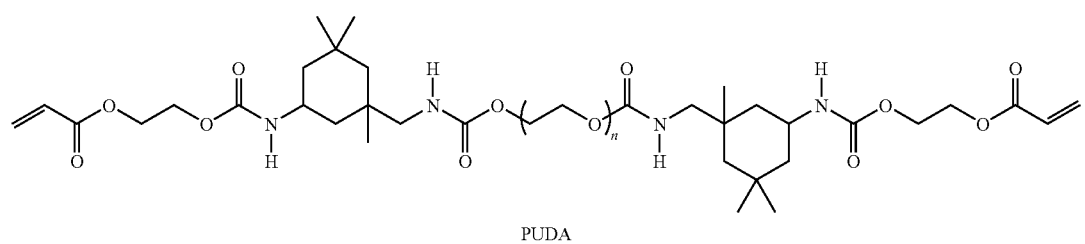

PUDA

PUHA

As the adhesive, it is possible to use acrylate phosphate-based materials, e.g., materials represented by formulas (P1), (P2), and (P3) below.

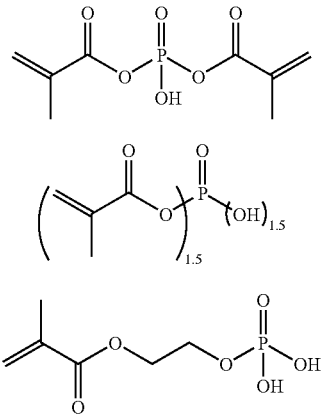

(P1)
(P2)
(P3)

As the polymerization initiator, it is possible to use, e.g., Cibageigy Irgacure 184 represented by formula (D1) below, and Cibageigy Darocure 1173 represented by formula (D2) below.

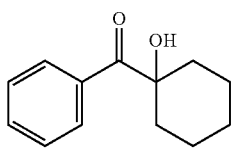

(D1)
(D2)

This ultraviolet-curing resin material has a large effect on the coating properties of the L1 dye and L2 dye, and hence has a large effect on the push-pull signal modulation degree of L1 of the disk.

The ultraviolet-curing resin material also has an influence on the warpage of the L0 substrate.

The push-pull signal modulation degree is preferably as large as possible, and can be increased to at least 0.26 or more. The warpage (tilt angle) is preferably as small as possible.

Ultraviolet-curing resin material samples 1 to 36 were obtained by using monomers and oligomers shown in Table A below, and mixing the monomers, the oligomers, additives, and polymerization initiators by combinations shown in Tables B to E below. Tables C and E also show the oxygen content ratio of each material, and the push-pull signal modulation degree and tilt angle when the material was used.

TABLE A

|  | C | H | O | N | Total | CHN/O | O/CHN | O/CHON |
|---|---|---|---|---|---|---|---|---|
| ADGA | 17 | 26 | 6 | 0 | 49 | 7.166666667 | 0.139534884 | 12.24489796 |
| IBOA | 13 | 20 | 2 | 0 | 35 | 16.5 | 0.060606061 | 5.714285714 |
| TPGDA | 15 | 24 | 6 | 0 | 45 | 6.5 | 0.153846154 | 13.33333333 |
| TITA | 18 | 23 | 9 | 3 | 53 | 4.888888889 | 0.204545455 | 16.98113208 |
| A-DCP | 18 | 24 | 4 | 0 | 46 | 10.5 | 0.095238095 | 8.695652174 |
| PUDA(n = 5) | 44 | 74 | 12 | 4 | 134 | 10.16666667 | 0.098360656 | 8.955223881 |
| PUHA | 42 | 54 | 36 | 12 | 144 | 3 | 0.333333333 | 25 |
| EO2BDMA | 27 | 32 | 6 | 0 | 65 | 9.833333333 | 0.101694915 | 9.230769231 |
| EO3BMA | 27 | 32 | 7 | 0 | 66 | 8.428571429 | 0.118644068 | 10.60606061 |
| DTTA | 24 | 34 | 9 | 0 | 67 | 6.444444444 | 0.155172414 | 13.43283582 |
| NPDA | 11 | 16 | 4 | 0 | 31 | 6.75 | 0.148148148 | 12.90322581 |
| HPDA | 16 | 24 | 6 | 0 | 46 | 6.666666667 | 0.15 | 13.04347826 |

TABLE B

|  | Monomer | Oligomer or monomer | Additive 1 | Additive 2 | Additive 3 |
|---|---|---|---|---|---|
| Sample 1 | AGDA(92) |  |  | P2(0.5) |  |
| Sample 2 | A-DCP(90.5) |  |  | PA(0.6) |  |
| Sample 3 | IBOA(57) | PUDA(38.3) | P3(0.1) |  |  |
| Sample 4 | IBOA(26) | PUDA(43.9) | TPGDA(26) | P3(0.1) |  |
| Sample 5 | TPGDA(10.8) | EO2BDMA(85) | P3(0.2) |  |  |
| Sample 6 | TPGDA(9.8) | EO2BDMA(70) | EO3BMA(15) | P3(0.2) |  |
| Sample 7 | IBOA(50) | TITA(6) | PUHA(38.9) | P3(0.1) |  |
| Sample 8 | IBOA(32.9) | TPGDA(17) | PUHA(23) | PUDA(23) | P3(0.1) |
| Sample 9 | IBOA(50) | PUHA(18.1) | PUDA(27.7) | P3(0.1) |  |
| Sample 10 | IBOA(51) | PUHA(28) | PUDA(16.9) | P3(0.1) |  |
| Sample 11 | IBOA(50) | PUHA(35) | PUDA(10.9) | P3(0.1) |  |
| Sample 12 | ADGA(97) |  |  |  |  |
| Sample 13 | ADGA(96) |  |  |  |  |
| Sample 14 | ADGA(86) | TPGDA(9.9) |  | P3(0.1) |  |
| Sample 15 | ADGA(83) | IBOA(10) |  |  |  |
| Sample 16 | ADGA(83) | IBOA(9.9) |  | P3(0.1) |  |

TABLE B-continued

|  | Monomer | Oligomer or monomer | Additive 1 | Additive 2 | Additive 3 |
|---|---|---|---|---|---|
| Sample 17 | ADGA(62) | IBOA(12) | PUDA(19) | P3(0.1) | |
| Sample 18 | ADGA(73) | IBOA(9.9) | PUDA(10) | P3(0.1) | |

TABLE C

|  | Hardener | O/(CHON) | Push-pull signal | Radial tilt (°) | Total evaluation |
|---|---|---|---|---|---|
| Sample 1 | Irg184(8) | 12.2 | 0.31 | 2.6 | ○ |
| Sample 2 | Irg184(9) | 8.7 | 0.06 | 1 | Δ |
| Sample 3 | Dar1173(4) | 6.686993603 | 0.07 | 0.8 | Δ |
| Sample 4 | Dar1173(4) | 5.417057569 | 0.07 | 0 | Δ |
| Sample 5 | Dar1173(4) | 9.286153846 | 0.13 | 2.5 | Δ |
| Sample 6 | Dar1173(5) | 9.359114219 | 0.14 | 2.5 | Δ |
| Sample 7 | Irg184(5) | 13.60101078 | 0.27 | 2.5 | ○ |
| Sample 8 | Irg184(4) | 11.95636816 | 0.26 | 2.5 | ○ |
| Sample 9 | Irg184(4.1) | 9.862739872 | 0.22 | 2.5 | Δ |
| Sample 10 | Irg184(4) | 11.42771855 | 0.26 | 2.5 | ○ |
| Sample 11 | Irg184(4) | 12.58326226 | 0.27 | 2.5 | ○ |
| Sample 12 | Irg184(3) | 11.87755102 | 0.26 | 2.5 | ○ |
| Sample 13 | Dar1173(4) | 11.75510204 | 0.293 | 2.35 | ○ |
| Sample 14 | Dar1173(4) | 11.85061224 | 0.281 | 2.03 | ○ |
| Sample 15 | Irg184(7) | 10.73469388 | 0.288 | 1.77 | ○ |
| Sample 16 | Irg184(7) | 10.72897959 | 0.267 | 1.71 | ○ |
| Sample 17 | Irg184(6.9) | 9.979043558 | 0.24 | 1.85 | Δ |
| Sample 18 | Irg184(7) | 10.40001218 | 0.289 | 1.78 | ○ |

TABLE D

|  | Monomer | Oligomer or monomer | Additive 1 | Additive 2 | Additive 3 |
|---|---|---|---|---|---|
| Sample 19 | ADGA(62) | IBOA(12) | PUDA(19) | P3(0.1) | |
| Sample 20 | ADGA(23.7) | IBOA(35) | PUHA(37.5) | P3(0.1) | |
| Sample 21 | TITA(12.4) | IBOA(43.3) | PUHA(37.5) | P3(0.1) | |
| Sample 22 | ADGA(67) | IBOA(25.9) |  | P3(0.1) | |
| Sample 23 | ADGA(84) | HPDA(10) |  | P3(0.1) | |
| Sample 24 | IBOA(25) | HPDA(24) | PUHA(44.9) | P3(0.1) | |
| Sample 25 | IBOA(25) | HPDA(34) | PUHA(34.9) | P3(0.1) | |
| Sample 26 | HPDA(54.9) | DTTA(5) | PUHA(34) | P3(0.1) | |
| Sample 27 | HPDA(54.9) | DTTA(10) | PUHA(29) | P3(0.1) | |
| Sample 28 | HPDA(60) | DTTA(13.7) | PMMA-F(20.2) | P3(0.1) | |
| Sample 29 | ADGA(80) | DTTA(13.9) |  | P3(0.1) | |
| Sample 30 | IBOA(20) | HPDA(25.9) | DTTA(10) | PUHA(28) | PMMA(10) |
| Sample 31 | HPDA(45.9) | DTTA(10) | PUHA(28) | PMMA(10) | P3(0.1) |
| Sample 32 | IBOA(15) | ADGA(53.9) | DTTA(14) | PMMA(11) | P3(0.1) |
| Sample 33 | IBOA(15) | ADGA(50.9) | DTTA(17) | PMMA(11) | P3(0.1) |
| Sample 34 | TPGDA(50) | TITA(6) | PUHA(38.9) | P3(0.1) | |
| Sample 35 | ADGA(86) | TPGDA(10) |  |  | |
| Sample 36 | ADGA(93) |  |  |  | |

TABLE E

|  | Hardener |  | O/(CHON) | Push-pull signal | Radial tilt (°) | Total evaluation |
|---|---|---|---|---|---|---|
| Sample 19 | Irg184(4) | Dar1173(2.9) | 9.979043558 | 0.23 | 2.1 | Δ |
| Sample 20 | Irg184(6) |  | 14.27704082 | 0.318 | 3.1 | Δ |
| Sample 21 | Irg184(6.7) |  | 13.95494609 | 0.308 | 2.9 | Δ |
| Sample 22 | Irg184(7) |  | 9.684081633 | 0.22 | 1.27 | Δ |
| Sample 23 | Dar1173(5.9) |  | 11.59006211 | 0.3 | 2.5 | ○ |
| Sample 24 | Irg184(6) |  | 15.78400621 | 0.36 | 4.2 | Δ |
| Sample 25 | Irg184(6) |  | 14.58835404 | 0.34 | 3.2 | Δ |
| Sample 26 | Irg184(6) |  | 16.33251136 | 0.35 | 4.3 | Δ |
| Sample 27 | Irg184(6) |  | 15.75415315 | 0.34 | 3 | Δ |
| Sample 28 | Irg184(6) |  | 9.001168073 | 0.21 | 1.84 | Δ |
| Sample 29 | Irg184(6) |  | 11.66308255 | 0.39 | 2.54 | ◉ |
| Sample 30 | P3(0.1) | Irg184(6) | 12.86440159 | 0.3 | 2.49 | ○ |
| Sample 31 | Irg184(6) |  | 14.3302401 | 0.35 | 2.54 | ○ |
| Sample 32 | Irg184(6) |  | 9.337739872 | 0.19 | 2.5 | Δ |
| Sample 33 | Irg184(6) |  | 9.373378008 | 0.15 | 2.48 | Δ |
| Sample 34 | Irg184(5) |  | 17.41053459 | Peel NG |  | X |
| Sample 35 | Dar1173(4) |  | 11.86394558 | 0.27 | 2.3 | ○ |
| Sample 36 | Irg184(7) |  | 11.3877551 | 0.28 | 2.4 | ○ |

Figure 8:
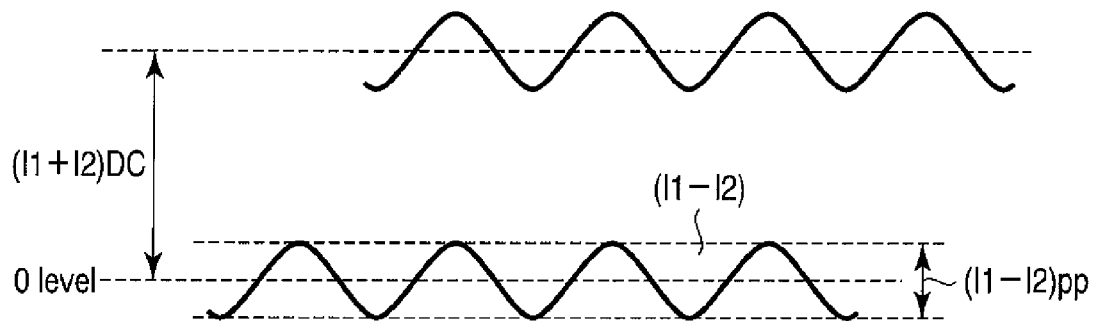
FIG. 8 is a view for explaining the configuration of wobble address data of an example of the write-once information recording medium according to the present invention.

Important evaluation indices were selected. A particularly important evaluation index is the tracking error signal modulation degree (push-pull signal) of L1. The definition is a value obtained by dividing a difference signal amplitude (I1−I2)pp by an average level (I1+I2)DC of a sum signal shown in FIG. 8. That is, push-pull signal (I1−I2)pp/(I1+I2)DC. This value must be 0.26 or more. It is found trough this practical experiment that since the ultraviolet-curing resin material largely changes the critical surface tension, the coating properties and gap fill properties of the dye also largely change. Accordingly, the L1 push-pull signal largely changes. If the push-pull signal is smaller than 0.26, an L1 tracking error may occur.

Another important index is the tilt angle (radial tilt) corresponding to the warpage of the L0 substrate after the ultraviolet-curing resin is transferred. It is found through this experiment that the ultraviolet-curing resin material largely changes the cure shrinkage stress, so the warpage of the L0 substrate largely changes. If the tilt angle is 2.6° or more, it is often impossible to decrease the radial tilt of the disk to 0.7° or less after adhesion. Since this adversely affects the tracking characteristics and signal characteristics of the completed double-layered disk, the data error rate readily increases.

The results of the tests of the various ultraviolet-curing resins described above were as follows. Sample 34 was NG because it was impossible to remove the L1 substrate like sample 34. Also, some samples had large tilts although the push-pull signals were 0.26 or more. Sample 29 was the best.

As indicated by sample 34 shown in Tables D and E, if the oxygen content ratio exceeds 14 atm %, it is often impossible to remove the polycarbonate substrate from the ultraviolet-curing resin layer. In addition, the tilt angle becomes 3° or more to cause imperfect adhesion.

Accordingly, a better disk is often obtained by selecting an ultraviolet-curing resin having an oxygen content ratio of 11 atm % or more, preferably, 11 to 14 atm %.

The write-once information recording medium explained in this embodiment comprises the transparent resin substrate formed into the shape of a disk by using a synthetic resin material such as polycarbonate. Concentric or spiral grooves are formed on this transparent resin substrate. This transparent resin substrate can be manufactured by injection molding by using a stamper.

A recording film containing an organic dye is formed on the transparent resin substrate so as to fill the grooves.

Figure 9:
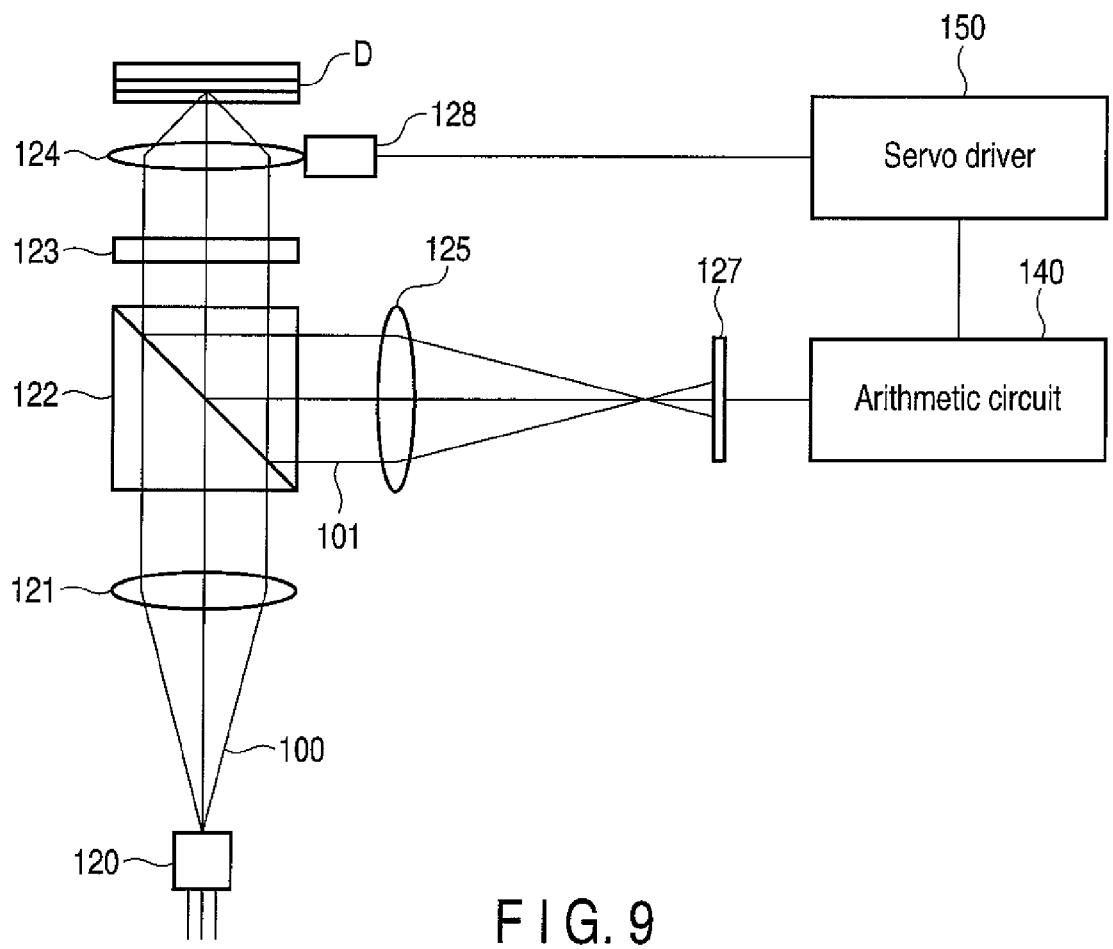
FIG. 9 is a block diagram showing an outline of the arrangement of a disk apparatus for playing back an example of the write-once information recording medium according to the present invention.

FIG. 9 is a block diagram showing an outline of the arrangement of a disk apparatus for playing back the write-once information recording medium described above.

As shown in FIG. 9, a write-once information recording medium D is, e.g., the single-sided, three-layered write-once information recording medium shown in FIG. 5. A short-wavelength semiconductor laser source 120 is used as the light source. The wavelength of the emitted beam has a violet wavelength band of, e.g., 400 to 410 nm. An emitted beam 100 from the semiconductor laser source 120 is collimated into a parallel beam by a collimating lens 121, and enters an objective lens 124 through a polarizing beam splitter 122 and λ/4 plate 123. After that, the emitted beam 100 concentrates to each information recording layer through the substrate of the write-once information recording medium D. Reflected light 101 from the information recording layer of the write-once information recording medium D is transmitted through the substrate of the write-once information recording medium D again, and reflected by the polarizing beam splitter 122 through the objective lens 124 and λ/4 plate 123. After that, the reflected light 101 enters a photodetector 127 through a condenser lens 125.

A light-receiving portion of the photodetector 127 is normally divided into a plurality of portions, and each light-receiving portion outputs an electric current corresponding to the light intensity. A I/V amplifier (current-to-voltage converter) (not shown) converts the output electric current into a voltage, and applies the voltage to an arithmetic circuit 140. The arithmetic circuit 140 calculates, e.g., a tilt error signal, HF signal, focusing error signal, and tracking error signal from the input voltage signal. The tilt error signal is used to perform tilt control. The HF signal is used to reproduce information recorded on the write-once information recording medium D. The focusing error signal is used to perform focusing control. The tracking error signal is used to perform tracking control.

An actuator 128 can drive the objective lens 124 in the vertical direction, the disk radial direction, and the tilt direction (the radial direction and/or the tangential direction). A servo driver 150 controls the actuator 128 so that the objective lens 124 follows an information track on the write-once information recording medium D. Note that there are two types of tilt directions: a "radial tilt" that occurs when the disk surface inclines toward the center of the write-once information recording medium; and a "tangential tilt" that occurs in the tangential direction of a track. A tilt that generally occurs owing to the warpage of a disk is the radial tilt. It is necessary to take account of not only a tilt that occurs during the manufacture of a disk but also a tilt that occurs owing to the deterioration with age or a rapid change of the use environment.

Figure 10:
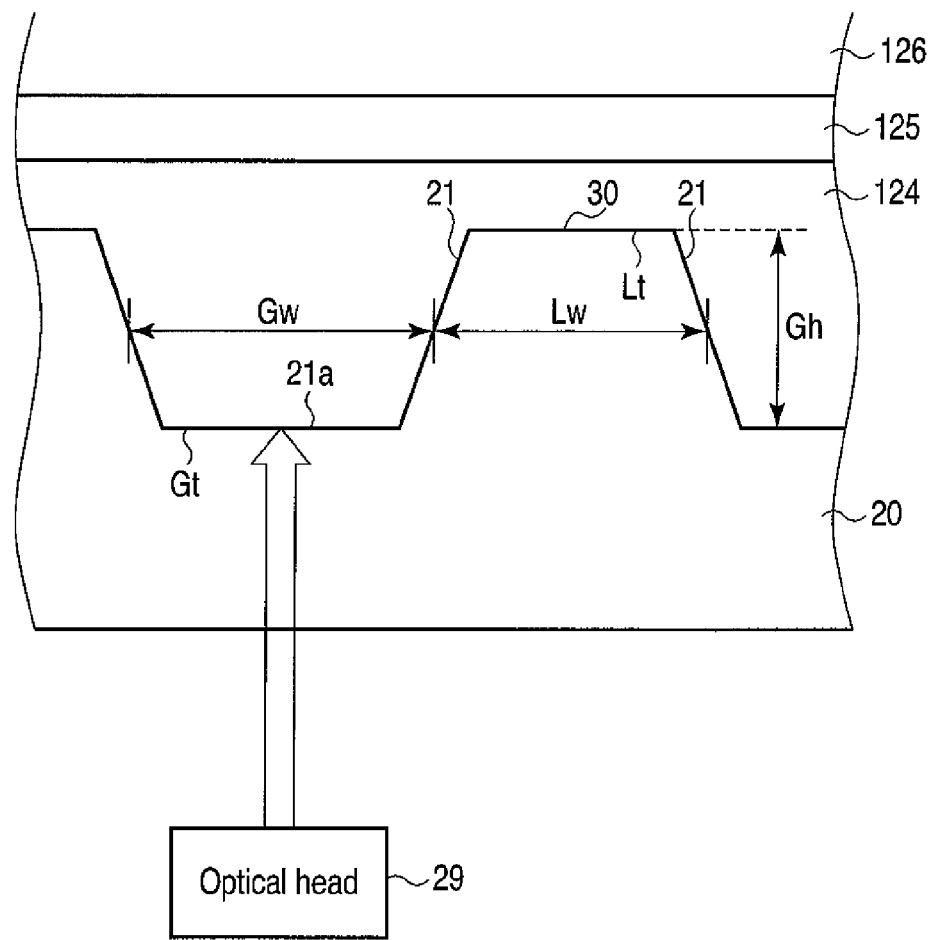
FIG. 10 is a view for explaining the relationship between a groove and land in an example of the write-once information recording medium according to the present invention.
Figure 11:
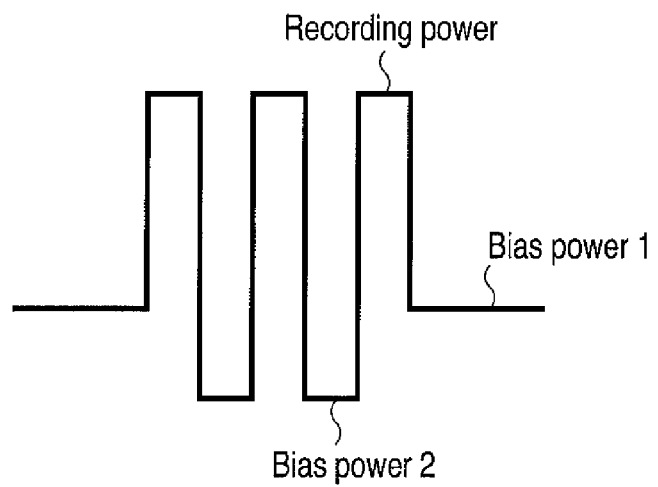
FIG. 11 is a waveform diagram showing an example of a signal to be recorded on the write-once information recording medium in order to conduct evaluation tests for recording/playback evaluation.

As shown in FIG. 10, a recording/reproduction laser beam from an optical head 29 enters the surface of a disk substrate 120 away from the surface coated with the recording film 124 of an HD DVD-R disk as the write-once information recording medium formed as described above.

In this case, information recording tracks are a bottom surface 21a of a groove 21 formed on the disk substrate 20 and a land 30 sandwiched between adjacent grooves 21. The recording track formed by the bottom surface 21a of the groove 21 will be called a groove track Gt. The recording track formed by the land 30 will be called a land track Lt.

Also, the difference between the surface heights of the land track Lt and groove track Gt will be called a groove depth Ch. Furthermore, the width of the groove track Gt at a height almost ½ the groove depth Gh will be called a groove width Gw, and the width of the land track Lt at a height almost ½ the groove depth Gh will be called a land width Lw.

Figure 12A:
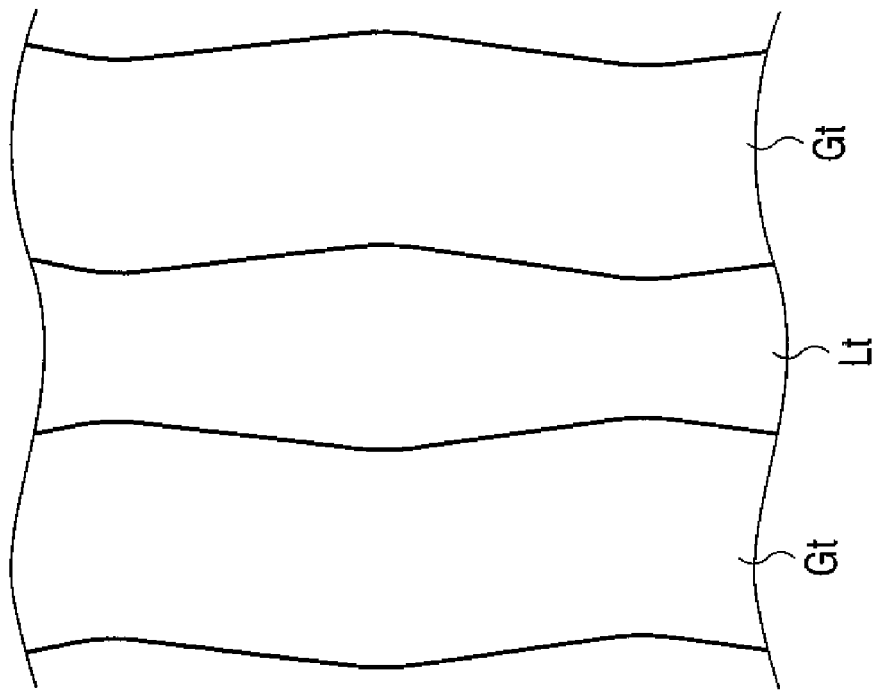
FIGS. 12A and 12B are views for explaining the wobble of a groove track of an example of the write-once information recording medium according to the present invention.
Figure 12B:
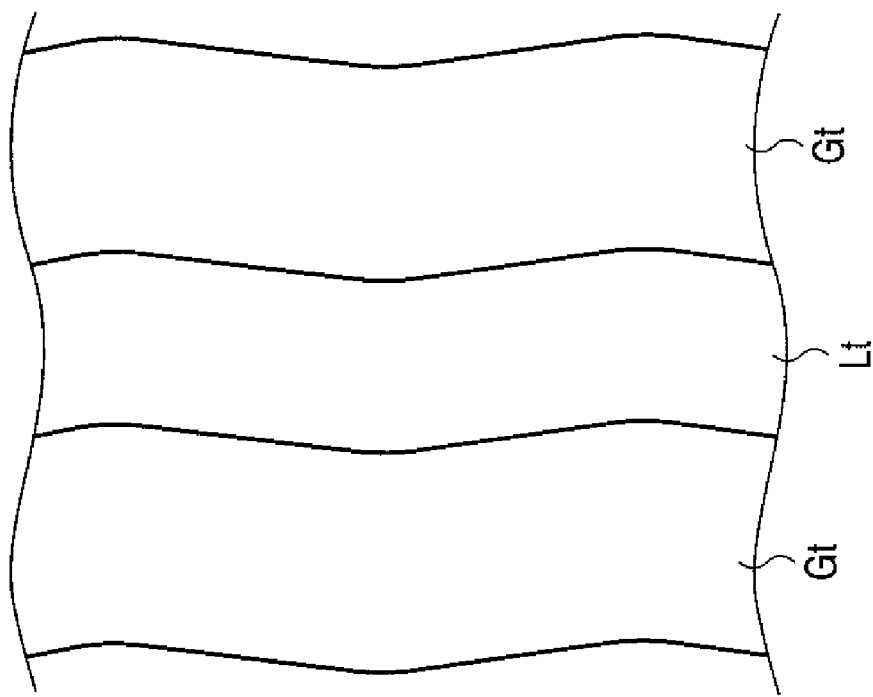

As described previously, the groove track at is wobbled to record various kinds of address information. FIG. 12A shows the case where adjacent groove tracks Gt are in phase. FIG. 12B shows the case where adjacent groove tracks Gt have opposite phases. Adjacent groove tracks at have various phase differences depending on the region of a write-once information recording medium 28.

EXAMPLES

The present invention will be described in more detail below by way of its examples.

A single-layered and double-layered HD DVD-R disks were manufactured as examples of the write-once information recording medium according to the present invention.

(Preparation of Single-Layer Stamper)

A glass disk 200 mm in diameter and 6 mm in thickness precisely polished to have a surface roughness Ra of 0.3 nm was cleaned in the order of inorganic alkali solution cleaning, ultrapure water cleaning, electrolytic degreasing, hot water cleaning, and pull-up drying by using a cleaning apparatus manufactured by TECHNO OKABAYASHI.

Then, the surface of the glass disk was spin-coated with HMDS (hexamethyldisilazane) by using a resist coating apparatus (manufactured by Access), and further spin-coated with a photoresist (DVR300 manufactured by ZEON). After that, the glass disk was prebaked on a hot plate (100° C. 10 min).

An HD DVD-R single-layer signal corresponding to a concentric or spiral pattern was recorded on the resist-coated glass disk by using a UV laser cutting machine (LBR manufactured by Access). The UV laser was a krypton ion laser having a wavelength of 351 nm, and the objective lens was an NA-0.90 type lens manufactured by Corning Toropel. The HD DVD-R signal source used was an HD DVD-R formatter manufactured by Eclipse.

Then, the recorded resist disk was spin-developed by a developing apparatus (manufactured by Access). The developer used was a dilute inorganic alkali developer prepared by mixing ultrapure water in an inorganic alkali developer (DE3 manufactured by TOKYO OHKA KOGYO) at a mixing ratio of 2:1.

Subsequently, an Ni sputtering apparatus (manufactured by Victor Company of Japan) was used to sputter a thin Ni film on the developed disk to make it conductive. The Ni film thickness was 10 nm. After that, Ni electroforming was performed in a nickel sulfamate solution hot bath by using an electroforming apparatus (manufactured by NOVEL TECHNOLOGY), thereby removing the Ni film from the resist disk. The duplicated Ni stamper was spin-cleaned and ashed with oxygen by an RIE apparatus to remove the residual photoresist from the surface. After that, the Ni stamper surface was spin-coated with a protective film (CLEANCOAT manufactured by FINE CHEMICAL JAPAN), and an single-layer stamper was completed by polishing the back surface, and punching along the inner and outer peripheries.

(Preparation of L0 Stamper)

A glass disk 200 mm in diameter and 6 mm in thickness precisely polished to have a surface roughness Ra of 0.3 nm was cleaned in the order of inorganic alkali solution cleaning, ultrapure water cleaning, electrolytic degreasing, hot water cleaning, and pull-up drying by using a cleaning apparatus manufactured by TECHNO OKABAYASHI.

Then, the surface of the glass disk was spin-coated with HMDS (hexamethyldisilazane) by using a resist coating apparatus (manufactured by Access), and further spin-coated with a photoresist (DVR300 manufactured by ZEON). After that, the glass disk was prebaked on a hot plate (100° C., 10 min)

An HD DVD-R L0 signal corresponding to a concentric or spiral pattern was recorded on the resist-coated glass disk by using a UV laser cutting machine (LER manufactured by Matsushita Electric). The UV laser was a krypton ion laser having a wavelength of 351 nm, and the objective lens was an NA-0.90 type lens manufactured by Corning Toropel. The HD DVD-R signal source used was an HD DVD-R formatter manufactured by KENWOOD TMI.

Then, the recorded resist disk was spin-developed by a developing apparatus (manufactured by Access). The developer used was a dilute inorganic alkali developer prepared by mixing ultrapure water in an inorganic alkali developer (DE3 manufactured by TOKYO OHKA KOGYO) at a mixing ratio of 2:1.

Subsequently, an Ni sputtering apparatus (manufactured by Victor Company of Japan) was used to sputter a thin Ni film on the developed disk to make it conductive. The Ni film thickness was 10 nm. After that, Ni electroforming was performed in a nickel sulfamate solution hot bath by using an electroforming apparatus (manufactured by NOVEL TECHNOLOGY), thereby removing the Ni film from the resist disk. The duplicated Ni stamper was spin-cleaned and ashed with oxygen by an RIE apparatus to remove the residual photoresist from the surface. After that, the Ni stamper surface was spin-coated with a protective film (CLEANCOAT S manufactured by FINE CHEMICAL JAPAN), and an L0 stamper was completed by polishing the back surface, and punching along the inner and outer peripheries.

(Preparation of L1/L2 Mother Stamper)

A glass disk 200 mm in diameter and 6 mm in thickness precisely polished to have a surface roughness Ra of 0.3 nm was cleaned in the order of inorganic alkali solution cleaning, ultrapure water cleaning, electrolytic degreasing, hot water cleaning, and pull-up drying by using a cleaning apparatus manufactured by TECHNO OKABAYASHI.

Then, the surface of the glass disk was spin-coated with HMDS (hexamethyldisilazane) by using a resist coating apparatus (manufactured by Access), and further spin-coated with a photoresist (DVR300 manufactured by ZEON). After that, the glass disk was prebaked on a hot plate (100° C., 10 min)

An HD DVD-R L1 signal corresponding to a concentric or spiral pattern was recorded on the resist-coated glass disk by using a UV laser cutting machine (LBR manufactured by Matsushita Electric). The UV laser was a krypton ion laser having a wavelength of 351 nm, and the objective lens was an NA-0.90 type lens manufactured by Corning Toropel. The HD DVD-R signal source used was an HD DVD-R formatter manufactured by KENWOOD TMI.

Then, the recorded resist disk was spin-developed by a developing apparatus (manufactured by Access). The developer used was a dilute inorganic alkali developer prepared by mixing ultrapure water in an inorganic alkali developer (DE3 manufactured by TOKYO OHKA KOGYO) at a mixing ratio of 2:1.

Subsequently, an Ni sputtering apparatus (manufactured by Victor Company of Japan) was used to sputter a thin Ni film on the developed disk to make it conductive. The Ni film thickness was 10 nm. After that, Ni electroforming was performed in a nickel sulfamate solution hot bath by using an electroforming apparatus (manufactured by NOVEL TECHNOLOGY), thereby removing the Ni film from the resist disk. The duplicated Ni father stamper was spin-cleaned and ashed with oxygen by an RIE apparatus to remove the residual photoresist from the surface. This RIE step was also a passivation process. After that, the electroforming apparatus was used again to electroform the Ni father stamper in the nickel sulfamate bath to duplicate an Ni mother stamper. The surface of this Ni mother stamper was spin-coated with a protective film (CLEANCOAT S manufactured by FINE CHEMICAL JAPAN), and an L1/L2 mother stamper was obtained by polishing the back surface, and punching along the inner and outer peripheries.

(Duplication of Singe-Layered HD DVD-R Disk)

The method of manufacturing the single-layered write-once information recording medium according to the present invention will be described in more detail below.

A disk was manufactured using a single-layered HD DVD-R mass-production line facility manufactured by Origin Electric. The process procedure was as follows.

The single-layer stamper was attached to the SD40E injection compression molding apparatus manufactured by Sumitomo Heavy Industries, and a polycarbonate disk substrate was molded. The polycarbonate resin was AD5503 manufactured by TEIJIN CHEMICALS. The mold was the G mold manufactured by SEIKOH GIKEN. The mold shrinkage factor was 0.6%. The molded plate thickness was 600 µm.

After the single-layer molded disk substrate was cooled, a single-layer organic dye solution was spin-coated and dried, and an AgBi (Di: 0.3% to 1%) film was DC-sputtered, thereby forming a single recording layer (the sputtering apparatus was an HD DVD-R Ag alloy film formation apparatus manufactured by Unaxis).

The thickness of the AgBi film was 100 nm. After that, a UV adhesive was spin-coated, adhered to a dummy molded substrate, and cured by ultraviolet radiation, thereby obtaining a single-layered write-once information recording medium.

(Duplication of Double-Layered HD DVD-R Disk)

The method of manufacturing the double-layered write-once information recording medium according to the present invention will be described in more detail below.

A disk was manufactured using a double-layer HD DVD-R mass-production line facility manufactured by Origin Electric. The process procedure was as follows.

The L0 stamper was attached to the SD40E injection compression molding apparatus manufactured by Sumitomo Heavy Industries, and a polycarbonate disk was molded. The polycarbonate resin was AD5503 manufactured by TEIJIN CHEMICALS. The mold was the G mold manufactured by SEIKOH GIKEN. The mold shrinkage factor was 0.6%. The molded plate thickness was 590 µm.

The L1 mother stamper was attached to another injection compression molding apparatus (SD40E manufactured by Sumitomo Heavy Industries), and a polycarbonate disk was molded. The polycarbonate resin was AD5503 manufactured by TEIJIN CHEMICALS. The mold was the G mold manufactured by SEIKOH GIKEN. The mold shrinkage factor was 0.6%. The molded plate thickness was 590 µm.

The L2 mother stamper was attached to still another injection compression molding apparatus (SD40E manufactured by Sumitomo Heavy Industries), and a polycarbonate disk was molded. The polycarbonate resin was AD5503 manufactured by TEIJIN CHEMICALS. The mold was the C mold manufactured by SEIKOH GIKEN. The mold shrinkage factor was 0.6%. The molded plate thickness was 590 µm.

After the L0 molded disk substrate was cooled, an L0 organic dye solution was spin-coated and dried, and an AgBi (Bi: 0.3% to 1%) film was DC-sputtered, thereby forming an L0 recording layer (the sputtering apparatus was an HD DVD-R double-layer Ag alloy film formation apparatus manufactured by Unaxis). The thickness of the AgBi film was 10 nm. After that, an ultraviolet-curing resin was spin-coated, adhered to the L1 molded disk substrate, and cured by ultraviolet radiation. The thickness of the ultraviolet-curing resin layer was 14 µm. When the L1 molded disk substrate was removed after that, a transfer pattern of the L1 molded substrate was transferred to the surface of the ultraviolet-curing resin on the L0 substrate. This pattern was an L1 pattern. Then, an L1 organic dye solution was spin-coated and dried, and an AgBi (Bi: 0.3% to 1%) film was DC-sputtered, thereby forming an L1 recording layer. After that, a UV adhesive was spin-coated, adhered to the already used L1 molded substrate, and cured by ultraviolet radiation, thereby obtaining a double-layered write-once information recording medium.

Single-layered and double-layered write-once information recording media were formed by using organic dye compounds described in Table 1 in the organic dye layers by combinations described in Tables 2 to 18, 2-2, 3-2, 4-2, 5-2, 6-2, 8-2, 9-2, 10-2, 11-2, 12-2, 14-2, 15-2, 16-2, 17-2, and 18-2.

Tables 2 to 6, 2-2, 3-2, 4-2, 5-2, and 6-2 show examples of the single-layered write-once information recording media. Tables 7 to 12, 8-2, 9-2, 10-2, 11-2, and 12-2 show examples of the measurements of L0. Tables 13 to 18, 14-2, 15-2, 16-2, 17-2, and 18-2 show examples of the measurements of L1.

Each HD DVD-R disk manufactured was recorded and played back at 4× by using the ODU 1000 HD DVD-R disk evaluation apparatus manufactured by Pulstec, and the PRSNR and SbER were evaluated. The width between the high side and low side of the recording peak power at which the PRSNR was 15 was divided by the average recording peak power, and the quotient was halved. The obtained value was evaluated as the 4× recording power margin (%). A recording power margin of ±15% is necessary in recording and playback in an actual drive. Also, the recorded disk was played back at 1× with a playback power of 0.4 mW, and the number of times of playback before the PRSNR was 15 was measured. The result was evaluated as the playback durability count. The playback durability count must be 1,000,000 or more in playback in an actual drive.

Tables 1 to 6 and 2-2 to 6-2 show these evaluation results. No monomer dye satisfied both a recording power margin of ±15% or more and a playback durability count of 1,000,000 or more. However, all dye mixtures containing monomers and polymers satisfied both the characteristics. Even when B2 to B6 were mixed, the mixtures satisfied both a recording power margin of ±15% or more and a playback durability count of 1,000,000 or more. The recording power margin was largest when tetramer dyes were mixed.

Each double-layered HD DVD-R disk manufactured was recorded and played back at 2× for both L0 and L1 by using the ODU 1000 HD DVD-R disk evaluation apparatus manufactured by Pulstec, and the PRSNR and SbER were evaluated. Note that L1 was recorded after L0 was recorded. The width between the high side and low side of the recording peak power at which the PRSNR was 15 was divided by the average recording peak power, and the quotient was halved. The obtained value was evaluated as the 2× recording power margin (%). A recording power margin of ±15% is necessary in recording and playback in an actual drive. Also, the recorded disk was played back at 1× with a playback power of 0.5 mW, and the number of times of playback before the PRSNR was 15 was measured. The result was evaluated as the playback durability count. The playback durability count must be 1,000,000 or more in playback in an actual drive.

Tables 7 to 12 and 8-2 to 12-2 show the evaluation results of L0. Tables 13 to 18 and 14-2 to 18-2 show the evaluation results of L1. No monomer dye satisfied both a recording power margin of ±15% or more and a playback durability count of 1,000,000 or more for both L0 and L1. However, all dye mixtures containing monomers and polymers satisfied both the characteristics for both L0 and L1. Even when B2 to B6 were mixed, the mixtures satisfied both a recording power margin of ±15% or more and a playback durability count of 1,000,000 or more for both L0 and L1. The recording power margin was largest for both L0 and L1 when tetramer dyes were mixed.

The effects of the present invention were confirmed as described above.

TABLE 1

| Dye | 4× recording power margin (±%) | Playback durability count (times) |
|---|---|---|
| 1-1 | 4 | 1800000 |
| 1-2 | 3 | 2500000 |
| 1-3 | 3.5 | 2200000 |

TABLE 1-continued

| Dye | 4× recording power margin (±%) | Playback durability count (times) |
|---|---|---|
| 1-4 | 6 | 1900000 |
| 1-5 | 3 | 1600000 |
| 2-1 | 5 | 2000000 |
| 2-2 | 4 | 2100000 |
| 2-3 | 2.5 | 1200000 |
| 2-4 | 3.8 | 1900000 |
| 2-5 | 4.1 | 1400000 |
| α2 | 17 | 950000 |
| α3 | 16 | 750000 |
| α4 | 18 | 400000 |
| α5 | 19 | 350000 |
| α6 | 16 | 200000 |
| β2 | 15 | 880000 |
| β3 | 18 | 790000 |
| β4 | 19 | 550000 |
| β5 | 17 | 420000 |
| β6 | 15 | 310000 |

TABLE 2

Dye mixture with α2 = α2 + X below mixing ratio α2:X = 3:7

| Mixed dye X | 4× recording power margin (±%) | Playback durability count (times) |
|---|---|---|
| 1-1 | 15.5 | 1100000 |
| 1-2 | 16 | 1500000 |
| 1-3 | 15.3 | 1400000 |
| 1-4 | 16.4 | 1200000 |
| 1-5 | 17 | 1050000 |
| 2-1 | 15.6 | 1100000 |
| 2-2 | 15.8 | 1400000 |
| 2-3 | 16.3 | 1080000 |
| 2-4 | 17 | 1550000 |
| 2-5 | 16.4 | 1300000 |

TABLE 3

Dye mixture with α3 = α3 + X below mixing ratio α3:X = 3:7

| Mixed dye X | 4× recording power margin (±%) | Playback durability count (times) |
|---|---|---|
| 1-1 | 16 | 1120000 |
| 1-2 | 16 | 1300000 |
| 1-3 | 15.3 | 1200000 |
| 1-4 | 16.8 | 1100000 |
| 1-5 | 17 | 1080000 |
| 2-1 | 16.2 | 1080000 |
| 2-2 | 15.4 | 1200000 |
| 2-3 | 16.7 | 1010000 |
| 2-4 | 16.2 | 1500000 |
| 2-5 | 16.4 | 1200000 |

TABLE 4

Dye mixture with α4 = α4 + X below mixing ratio α2:X = 3:7

| Mixed dye X | 4× recording power margin (±%) | Playback durability count (times) |
|---|---|---|
| 1-1 | 17.2 | 1100000 |
| 1-2 | 16.1 | 1200000 |
| 1-3 | 15.4 | 1150000 |
| 1-4 | 17.3 | 1080000 |

TABLE 4-continued

Dye mixture with α4 = α4 + X below mixing ratio α2:X = 3:7

| Mixed dye X | 4× recording power margin (±%) | Playback durability count (times) |
|---|---|---|
| 1-5 | 16.9 | 1070000 |
| 2-1 | 16.4 | 1060000 |
| 2-2 | 17.5 | 1120000 |
| 2-3 | 17.2 | 1008000 |
| 2-4 | 16.9 | 1300000 |
| 2-5 | 16.3 | 1100000 |

TABLE 5

Dye mixture with α5 = α5 + X below mixing ratio α5:X = 3:7

| Mixed dye X | 4× recording power margin (±%) | Playback durability count (times) |
|---|---|---|
| 1-1 | 15.6 | 1080000 |
| 1-2 | 16.1 | 1150000 |
| 1-3 | 15.4 | 1120000 |
| 1-4 | 16.7 | 1070000 |
| 1-5 | 16.9 | 1055000 |
| 2-1 | 15.8 | 1050000 |
| 2-2 | 15.8 | 1115000 |
| 2-3 | 16.1 | 1000700 |
| 2-4 | 16.7 | 1200000 |
| 2-5 | 16 | 1008000 |

TABLE 6

Dye mixture with α6 = α6 + X below mixing ratio α6:X = 3:7

| Mixed dye X | 4× recording power margin (±%) | Playback durability count (times) |
|---|---|---|
| 1-1 | 15.6 | 1100000 |
| 1-2 | 16.1 | 1140000 |
| 1-3 | 15.4 | 1200000 |
| 1-4 | 16.7 | 1050000 |
| 1-5 | 16.9 | 1040000 |
| 2-1 | 15.8 | 1030000 |
| 2-2 | 15.8 | 1100000 |
| 2-3 | 16.1 | 1005000 |
| 2-4 | 16.7 | 1100000 |
| 2-5 | 16 | 1005000 |

TABLE 2-2

Dye mixture with β2 = β2 + X below mixing ratio β2:X = 3:7

| Mixed dye X | 4× recording power margin (±%) | Playback durability count (times) |
|---|---|---|
| 1-1 | 15.6 | 1200000 |
| 1-2 | 16.1 | 1450000 |
| 1-3 | 16 | 1410000 |
| 1-4 | 16.2 | 1300000 |
| 1-5 | 15.9 | 1100000 |
| 2-1 | 16 | 1150000 |
| 2-2 | 15.3 | 1450000 |
| 2-3 | 16.9 | 1120000 |
| 2-4 | 17 | 1450000 |
| 2-5 | 16 | 1200000 |

TABLE 3-2

Dye mixture with β3 = β3 + X below mixing ratio β3:X = 3:7

| Mixed dye X | 4× recording power margin (±%) | Playback durability count (times) |
|---|---|---|
| 1-1 | 15.9 | 1130000 |
| 1-2 | 16 | 1200000 |
| 1-3 | 16.3 | 1100000 |
| 1-4 | 16.8 | 1050000 |
| 1-5 | 17.1 | 1050000 |
| 2-1 | 17 | 1060000 |
| 2-2 | 16.5 | 1150000 |
| 2-3 | 16 | 1020000 |
| 2-4 | 15.3 | 1140000 |
| 2-5 | 15.9 | 1100000 |

TABLE 4-2

Dye mixture with β4 = β4 + X below mixing ratio β4:X = 3:7

| Mixed dye X | 4× recording power margin (±%) | Playback durability count (times) |
|---|---|---|
| 1-1 | 17 | 1120000 |
| 1-2 | 17.2 | 1150000 |
| 1-3 | 17.5 | 1100000 |
| 1-4 | 17.3 | 1070000 |
| 1-5 | 16 | 1040000 |
| 2-1 | 15.9 | 1030000 |
| 2-2 | 15.5 | 1080000 |
| 2-3 | 15.2 | 1100000 |
| 2-4 | 17 | 1050000 |
| 2-5 | 15.7 | 1100000 |

TABLE 5-2

Dye mixture with β5 = β5 + X below mixing ratio β5:X = 3:7

| Mixed dye X | 4× recording power margin (±%) | Playback durability count (times) |
|---|---|---|
| 1-1 | 15.7 | 1050000 |
| 1-2 | 15.8 | 1150000 |
| 1-3 | 16 | 1050000 |
| 1-4 | 16.3 | 1060000 |
| 1-5 | 16.5 | 1090000 |
| 2-1 | 15.9 | 1030000 |
| 2-2 | 16.2 | 1060000 |
| 2-3 | 16.3 | 1008000 |
| 2-4 | 15.2 | 1100000 |
| 2-5 | 15.1 | 1010000 |

TABLE 6-2

Dye mixture with β6 = β6 + X below mixing ratio β6:X = 3:7

| Mixed dye X | 4× recording power margin (±%) | Playback durability count (times) |
|---|---|---|
| 1-1 | 15.3 | 1050000 |
| 1-2 | 16 | 1100000 |
| 1-3 | 16 | 1100000 |
| 1-4 | 16.2 | 1040000 |
| 1-5 | 16 | 1030000 |
| 2-1 | 15.3 | 1050000 |
| 2-2 | 16 | 1150000 |
| 2-3 | 15.8 | 1030000 |
| 2-4 | 15.7 | 1060000 |
| 2-5 | 16.1 | 1020000 |

TABLE 7

| L0 dye | L0 2× recording power margin (±%) | L0 Playback durability count (times) |
|---|---|---|
| 1-1 | 3 | 1800000 |
| 1-2 | 2.5 | 2500000 |
| 1-3 | 3 | 2200000 |
| 1-4 | 4 | 1900000 |
| 1-5 | 4 | 1600000 |
| 2-1 | 5 | 2000000 |
| 2-2 | 3.5 | 2100000 |
| 2-3 | 2 | 1200000 |
| 2-4 | 3 | 1900000 |
| 2-5 | 3.2 | 1400000 |
| α2 | 16 | 950000 |
| α3 | 16 | 750000 |
| α4 | 17 | 400000 |
| α5 | 19 | 350000 |
| α6 | 16 | 200000 |
| β2 | 14 | 880000 |
| β3 | 17 | 790000 |
| β4 | 18 | 550000 |
| β5 | 16 | 420000 |
| β6 | 16 | 310000 |

TABLE 8

Dye mixture with α2 = α2 + X below mixing ratio α2:X = 3:7

| L0 Mixed dye X | L0 2× recording power margin (±%) | L0 Playback durability count (times) |
|---|---|---|
| 1-1 | 15 | 1100000 |
| 1-2 | 15.5 | 1500000 |
| 1-3 | 15.8 | 1400000 |
| 1-4 | 16.2 | 1200000 |
| 1-5 | 16.8 | 1050000 |
| 2-1 | 15.7 | 1100000 |
| 2-2 | 15.6 | 1400000 |
| 2-3 | 16 | 1080000 |
| 2-4 | 16.8 | 1550000 |
| 2-5 | 16.2 | 1300000 |

TABLE 9

Dye mixture with α3 = α3 + X below mixing ratio α3:X = 3:7

| L0 Mixed dye X | L0 2× recording power margin (±%) | L0 Playback durability count (times) |
|---|---|---|
| 1-1 | 15.2 | 1150000 |
| 1-2 | 15.6 | 1450000 |
| 1-3 | 16 | 1330000 |
| 1-4 | 16 | 1245000 |
| 1-5 | 16.5 | 1100000 |
| 2-1 | 16 | 1050000 |
| 2-2 | 16.1 | 1250000 |
| 2-3 | 15.7 | 1100000 |
| 2-4 | 15.3 | 1430000 |
| 2-5 | 15.4 | 1220000 |

TABLE 10

Dye mixture with α4 = α4 + X below mixing ratio
α4:X = 3:7

| L0 Mixed dye X | L0 2× recording power margin (±%) | L0 Playback durability count (times) |
|---|---|---|
| 1-1 | 16.2 | 1050000 |
| 1-2 | 16.6 | 1230000 |
| 1-3 | 16.9 | 1320000 |
| 1-4 | 17 | 1130000 |
| 1-5 | 17 | 1040000 |
| 2-1 | 16.5 | 1050000 |
| 2-2 | 17.2 | 1200000 |
| 2-3 | 17.3 | 1040000 |
| 2-4 | 15.9 | 1340000 |
| 2-5 | 15.8 | 1100000 |

TABLE 11

Dye mixture with α5 = α5 + X below mixing ratio
α5:X = 3:7

| L0 Mixed dye X | L0 2× recording power margin (±%) | L0 Playback durability count (times) |
|---|---|---|
| 1-1 | 16 | 1030000 |
| 1-2 | 16 | 1200000 |
| 1-3 | 16 | 1100000 |
| 1-4 | 15.2 | 1100000 |
| 1-5 | 15.3 | 1020000 |
| 2-1 | 15.4 | 1050000 |
| 2-2 | 15.2 | 1120000 |
| 2-3 | 15.2 | 1020000 |
| 2-4 | 15.3 | 1200000 |
| 2-5 | 15.1 | 1050000 |

TABLE 12

Dye mixture with α6 = α6 + X below mixing ratio
α6:X = 3:7

| L0 Mixed dye X | L0 2× recording power margin (±%) | L0 Playback durability count (times) |
|---|---|---|
| 1-1 | 15.1 | 1030000 |
| 1-2 | 15.2 | 1008000 |
| 1-3 | 15.1 | 1030000 |
| 1-4 | 15.2 | 1010000 |
| 1-5 | 15.4 | 1020000 |
| 2-1 | 15.3 | 1005000 |
| 2-2 | 15.9 | 1100000 |
| 2-3 | 15.2 | 1020000 |
| 2-4 | 15.3 | 1040000 |
| 2-5 | 15.9 | 1006000 |

TABLE 8-2

Dye mixture with β2 = β2 + X below mixing ratio
β2:X = 3:7

| L0 Mixed dye X | L0 2× recording power margin (±%) | L0 Playback durability count (times) |
|---|---|---|
| 1-1 | 15.2 | 1100000 |
| 1-2 | 16 | 1200000 |
| 1-3 | 16 | 1200000 |
| 1-4 | 16.1 | 1300000 |
| 1-5 | 16.3 | 1100000 |

TABLE 8-2-continued

Dye mixture with β2 = β2 + X below mixing ratio
β2:X = 3:7

| L0 Mixed dye X | L0 2× recording power margin (±%) | L0 Playback durability count (times) |
|---|---|---|
| 2-1 | 15.2 | 1080000 |
| 2-2 | 15.1 | 1200000 |
| 2-3 | 15.4 | 1100000 |
| 2-4 | 15.7 | 1200000 |
| 2-5 | 15.2 | 1200000 |

TABLE 9-2

Dye mixture with β3 = β3 + X below mixing ratio
β3:X = 3:7

| L0 Mixed dye X | L0 2× recording power margin (±%) | L0 Playback durability count (times) |
|---|---|---|
| 1-1 | 15.4 | 1120000 |
| 1-2 | 15.4 | 1300000 |
| 1-3 | 16 | 1200000 |
| 1-4 | 16.3 | 1100000 |
| 1-5 | 16.9 | 1060000 |
| 2-1 | 16.2 | 1050000 |
| 2-2 | 16 | 1130000 |
| 2-3 | 15.6 | 1050000 |
| 2-4 | 16 | 1200000 |
| 2-5 | 15.3 | 1100000 |

TABLE 10-2

Dye mixture with β4 = β4 + X below mixing ratio
β4:X = 3:7

| L0 Mixed dye X | L0 2× recording power margin (±%) | L0 Playback durability count (times) |
|---|---|---|
| 1-1 | 16 | 1070000 |
| 1-2 | 16.5 | 1200000 |
| 1-3 | 17 | 1100000 |
| 1-4 | 17.2 | 1100000 |
| 1-5 | 17 | 1030000 |
| 2-1 | 17.3 | 1020000 |
| 2-2 | 17.8 | 1100000 |
| 2-3 | 17.5 | 1100000 |
| 2-4 | 17 | 1200000 |
| 2-5 | 16.1 | 1100000 |

TABLE 11-2

Dye mixture with β5 = β5 + X below mixing ratio
β5:X = 3:7

| L0 Mixed dye X | L0 2× recording power margin (±%) | L0 Playback durability count (times) |
|---|---|---|
| 1-1 | 15.2 | 1040000 |
| 1-2 | 15.3 | 1050000 |
| 1-3 | 15.8 | 1100000 |
| 1-4 | 15.3 | 1070000 |
| 1-5 | 15.9 | 1030000 |
| 2-1 | 16 | 1020000 |
| 2-2 | 16 | 1060000 |
| 2-3 | 15.4 | 1100000 |
| 2-4 | 15.3 | 1120000 |
| 2-5 | 15.2 | 1110000 |

TABLE 12-2

Dye mixture with β6 = β6 + X below mixing ratio
β6:X = 3:7

| L0 Mixed dye X | L0 2× recording power margin (±%) | L0 Playback durability count (times) |
|---|---|---|
| 1-1 | 15 | 1006000 |
| 1-2 | 15.5 | 1009000 |
| 1-3 | 15 | 1030000 |
| 1-4 | 15.3 | 1020000 |
| 1-5 | 15.2 | 1100000 |
| 2-1 | 15.6 | 1008000 |
| 2-2 | 15.3 | 1020000 |
| 2-3 | 15.2 | 1025000 |
| 2-4 | 15.1 | 1010000 |
| 2-5 | 15 | 1004000 |

TABLE 13

| L1 dye | L1 2× recording power margin (±%) | L1 Playback durability count (times) |
|---|---|---|
| 1-1 | 4 | 1800000 |
| 1-2 | 2 | 2500000 |
| 1-3 | 3 | 2200000 |
| 1-4 | 4 | 1900000 |
| 1-5 | 5 | 1600000 |
| 2-1 | 3 | 2000000 |
| 2-2 | 3 | 2100000 |
| 2-3 | 3 | 1200000 |
| 2-4 | 2 | 1900000 |
| 2-5 | 2.5 | 1400000 |
| α2 | 15.5 | 950000 |
| α3 | 16 | 750000 |
| α4 | 16.8 | 400000 |
| α5 | 18 | 350000 |
| α6 | 17 | 200000 |
| β2 | 15 | 880000 |
| β3 | 15.3 | 790000 |
| β4 | 16 | 550000 |
| β5 | 15.3 | 420000 |
| β6 | 15.8 | 310000 |

TABLE 14

Dye mixture with α2 = α2 + X below mixing ratio
α2:X = 3:7

| L1 Mixed dye X | L1 2× recording power margin (±%) | L1 Playback durability count (times) |
|---|---|---|
| 1-1 | 15.2 | 1200000 |
| 1-2 | 16 | 1200000 |
| 1-3 | 15.7 | 1300000 |
| 1-4 | 16 | 1300000 |
| 1-5 | 16.3 | 1200000 |
| 2-1 | 15.1 | 1100000 |
| 2-2 | 15.2 | 1100000 |
| 2-3 | 15 | 1009000 |
| 2-4 | 15.3 | 1200000 |
| 2-5 | 15.1 | 1100000 |

TABLE 14-2

Dye mixture with β2 = β2 + X below mixing ratio
β2:X = 3:7

| L1 Mixed dye X | L1 2× recording power margin (±%) | L1 Playback durability count (times) |
|---|---|---|
| 1-1 | 16 | 1140000 |
| 1-2 | 15.3 | 1180000 |
| 1-3 | 15.8 | 1300000 |
| 1-4 | 15.9 | 1240000 |
| 1-5 | 15.4 | 1200000 |
| 2-1 | 15.7 | 1100000 |
| 2-2 | 16 | 1120000 |
| 2-3 | 16 | 1100000 |
| 2-4 | 15.2 | 1130000 |
| 2-5 | 15.4 | 1050000 |

TABLE 15-2

Dye mixture with β3 = β3 + X below mixing ratio
β3:X = 3:7

| L1 Mixed dye X | L1 2× recording power margin (±%) | L1 Playback durability count (times) |
|---|---|---|
| 1-1 | 15.2 | 1100000 |
| 1-2 | 15.3 | 1070000 |
| 1-3 | 15.7 | 1100000 |
| 1-4 | 16.1 | 1120000 |
| 1-5 | 16 | 1050000 |
| 2-1 | 15.2 | 1050000 |
| 2-2 | 15.8 | 1130000 |
| 2-3 | 15.7 | 1120000 |
| 2-4 | 16 | 1030000 |
| 2-5 | 15.9 | 1020000 |

TABLE 16-2

Dye mixture with β4 = β4 + X below mixing ratio
β4:X = 3:7

| L1 Mixed dye X | L1 2× recording power margin (±%) | L1 Playback durability count (times) |
|---|---|---|
| 1-1 | 17 | 1100000 |
| 1-2 | 17.1 | 1120000 |
| 1-3 | 17.3 | 1100000 |
| 1-4 | 17.2 | 1060000 |
| 1-5 | 17.1 | 1050000 |
| 2-1 | 16.4 | 1100000 |
| 2-2 | 16.8 | 1070000 |
| 2-3 | 16 | 1010000 |
| 2-4 | 16.2 | 1100000 |
| 2-5 | 15.9 | 1030000 |

TABLE 17-2

Dye mixture with β5 = β5 + X below mixing ratio
β5:X = 3:7

| L1 Mixed dye X | L1 2× recording power margin (±%) | L1 Playback durability count (times) |
|---|---|---|
| 1-1 | 15.7 | 1100000 |
| 1-2 | 15.2 | 1030000 |
| 1-3 | 15.4 | 1040000 |
| 1-4 | 15.5 | 1070000 |
| 1-5 | 15.6 | 1200000 |

TABLE 17-2-continued

Dye mixture with β5 = β5 + X below mixing ratio
β5:X = 3:7

| L1 Mixed dye X | L1 2× recording power margin (±%) | L1 Playback durability count (times) |
|---|---|---|
| 2-1 | 15.7 | 1060000 |
| 2-2 | 15.8 | 1005000 |
| 2-3 | 15.2 | 1003000 |
| 2-4 | 15.7 | 1002000 |
| 2-5 | 15.7 | 1001000 |

TABLE 18-2

Dye mixture with β6 = β6 + X below mixing ratio
β6:X = 3:7

| L1 Mixed dye X | L1 2× recording power margin (±%) | L1 Playback durability count (times) |
|---|---|---|
| 1-1 | 15 | 1006000 |
| 1-2 | 15 | 1003000 |
| 1-3 | 15.2 | 1002000 |
| 1-4 | 15.7 | 1002300 |
| 1-5 | 15.4 | 1004000 |
| 2-1 | 15.3 | 1006000 |
| 2-2 | 15.7 | 1002000 |
| 2-3 | 15.8 | 1003000 |
| 2-4 | 15.3 | 1002200 |
| 2-5 | 15.9 | 1001000 |

TABLE 15

Dye mixture with α3 = α3 + X below mixing ratio
α3:X = 3:7

| L1 Mixed dye X | L1 2× recording power margin (±%) | L1 Playback durability count (times) |
|---|---|---|
| 1-1 | 16 | 1150000 |
| 1-2 | 15.8 | 1210000 |
| 1-3 | 15.3 | 1290000 |
| 1-4 | 15.3 | 1250000 |
| 1-5 | 16 | 1140000 |
| 2-1 | 16.2 | 1100000 |
| 2-2 | 15.9 | 1100000 |
| 2-3 | 15.3 | 1100000 |
| 2-4 | 15.4 | 1140000 |
| 2-5 | 15.1 | 1110000 |

TABLE 16

Dye mixture with α4 = α4 + X below mixing ratio
α4:X = 3:7

| L1 Mixed dye X | L1 2× recording power margin (±%) | L1 Playback durability count (times) |
|---|---|---|
| 1-1 | 16.3 | 1100000 |
| 1-2 | 16.7 | 1100000 |
| 1-3 | 17 | 1200000 |
| 1-4 | 17 | 1100000 |
| 1-5 | 17 | 1130000 |
| 2-1 | 16.8 | 1080000 |
| 2-2 | 15.9 | 1140000 |
| 2-3 | 16 | 1100000 |
| 2-4 | 17.4 | 1120000 |
| 2-5 | 16.3 | 1060000 |

TABLE 17

Dye mixture with α5 = α5 + X below mixing ratio
α5:X = 3:7

| L1 Mixed dye X | L1 2× recording power margin (±%) | L1 Playback durability count (times) |
|---|---|---|
| 1-1 | 15.2 | 1040000 |
| 1-2 | 15.4 | 1100000 |
| 1-3 | 15.2 | 1050000 |
| 1-4 | 15.1 | 1060000 |
| 1-5 | 15.1 | 1100000 |
| 2-1 | 15.2 | 1060000 |
| 2-2 | 15.1 | 1050000 |
| 2-3 | 15 | 1040000 |
| 2-4 | 15.2 | 1030000 |
| 2-5 | 15.2 | 1060000 |

TABLE 18

Dye mixture with α6 = α6 + X below mixing ratio
α6:X = 3:7

| L1 Mixed dye X | L1 2× recording power margin (±%) | L1 Playback durability count (times) |
|---|---|---|
| 1-1 | 15 | 1020000 |
| 1-2 | 15 | 1006000 |
| 1-3 | 15.2 | 1030000 |
| 1-4 | 15.1 | 1040000 |
| 1-5 | 15.1 | 1050000 |
| 2-1 | 15.1 | 1007000 |
| 2-2 | 15.2 | 1008000 |
| 2-3 | 15.3 | 1008000 |
| 2-4 | 15.1 | 1004000 |
| 2-5 | 15 | 1003000 |

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A write-once information recording medium comprising a transparent resin substrate with concentric or spiral grooves and lands, and a recording film formed on the grooves and lands of the transparent resin substrate, wherein the recording film comprises an organic dye layer comprising a metal complex monomer comprising a structure in which two constituent units represented by formula (1) are arranged for one central metal and a metal complex polymer comprising a structure in which two constituent units represented by formula (2) are arranged for one central metal;

a recording mark is formed in the organic dye layer by emission of a short-wavelength laser beam, and light reflectance of the recording mark formed by emission of the short-wavelength laser beam is higher than light reflectance before the emission of the short-wavelength laser beam in the organic dye layer; and the grooves wobble within a predetermined amplitude range,

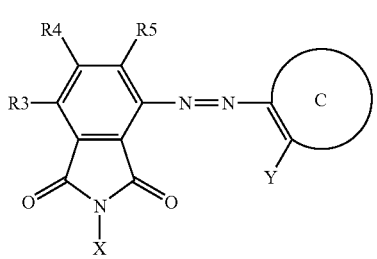

(1)

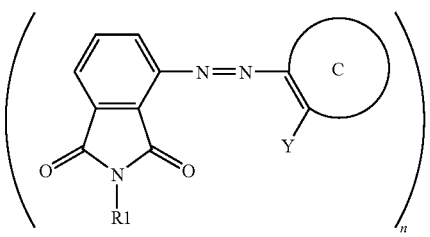

(2)

wherein ring C in (1) is a substituted hydrocarbon ring, a non-substituted hydrocarbon ring, a substituted heterocyclic ring, or a non-substituted heterocyclic ring;

the central metal in (1) is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium;

X in formula (1) comprises an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group;

Y in formula (1) comprises an active hydrogen group selected from the group consisting of —SH, —SO$_2$H, —SO$_3$H, —NH$_2$, —NHR, —OH, —COOH, —B(OH)$_2$, —PO(OH)$_2$, —NHCOH, —NHCOR, and NHSOR; and R3, R4, and R5 in formula (1) comprise an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group, wherein ring C in formula (2) is a substituted hydrocarbon ring, a non-substituted hydrocarbon ring, a substituted heterocyclic ring, or a non-substituted heterocyclic ring;

the central metal is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium;

R1 in formula (2) comprises an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group; and Y in formula (2) comprises an active hydrogen group selected from the group consisting of —SH, —SO$_2$H, —SO$_3$H, —NH$_2$, —NHR, —OH, —COOH, —B(OH)$_2$, —PO(OH)$_2$, —NHCOH, —NHCOR, and NHSOR.

2. The medium of claim 1, wherein the metal complex polymer is represented by either formula (3) or formula (4) below:

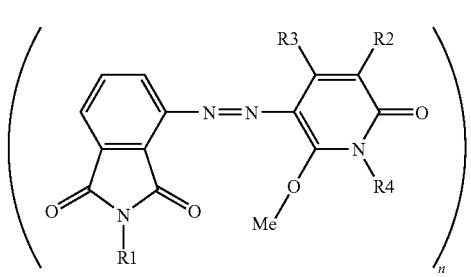

(3)

-continued

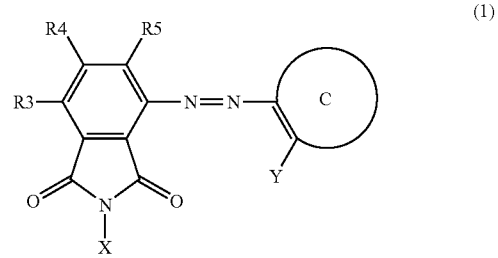
(4)

wherein n is an integer between 2 and 6;

R1, R2, R3, and R4 comprise an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group; and the central metal (Me) is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium.

3. A write-once information recording medium comprising a transparent resin substrate comprising concentric or spiral grooves and lands, a first recording film formed on the grooves and lands of the transparent resin substrate, an interlayer formed on the first recording film and made of a transparent resin material comprising concentric or spiral grooves and lands, and a second recording film formed on the grooves and lands of the interlayer, wherein:

at least one of the first recording film and the second recording film includes an organic dye layer containing a metal complex monomer comprising a structure in which two constituent units represented by formula (1) are arranged for one central metal and a metal complex polymer comprising a structure in which two constituent units represented by formula (2) are arranged for one central metal;

a recording mark is formed in each of the first recording film and the second recording film by emission of a short-wavelength laser beam;

light reflectance of the recording mark formed by emission of the short-wavelength laser beam is higher than light reflectance before the emission of the short-wavelength laser beam in the first recording film and the second recording film; and the grooves wobble within a predetermined amplitude range,

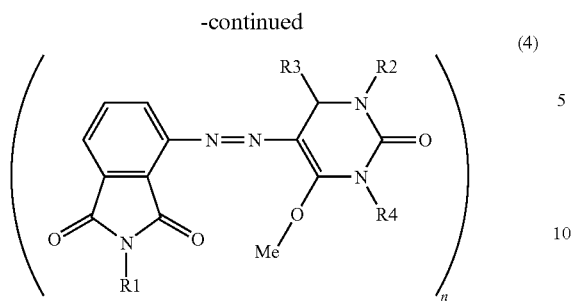
(1)

wherein ring C in formula (1) is a substituted hydrocarbon ring, a non-substituted hydrocarbon ring, a substituted heterocyclic ring, or a non-substituted heterocyclic ring;

the central metal is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium;

X in formula (1) comprises an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an acylamino group, a heteroarylamino group, an alkylcarbonylamino group, an arylcarbonylamino group, a phenyl group, a phthaloimide group, and a barbituric acid group;

Y in formula (1) comprises an active hydrogen group selected from the group consisting of —SH, —SO$_2$H, —SO$_3$H, —NH$_2$, —NHR, —OH, —COOH, —B(OH)$_2$, —PO(OH)$_2$, —NHCOH, —NHCOR, and NHSOR; and R3, R4, and R5 in formula (1) comprise an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group,

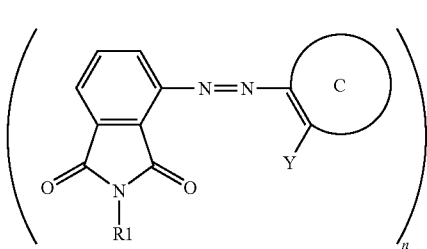

(2)

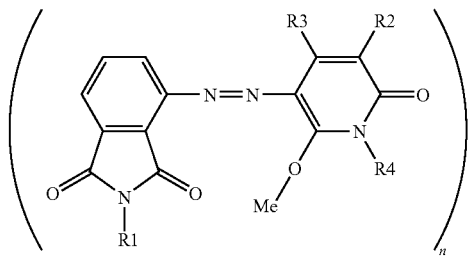

(3)

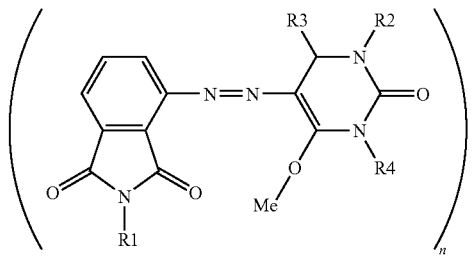

(4)

wherein ring C in formula (2) is a substituted hydrocarbon ring, a non-substituted hydrocarbon ring, a substituted heterocyclic ring, or a non-substituted heterocyclic ring;

the central metal is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium;

R1 in formula (2) comprises an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group, an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group; and Y in formula (2) comprises an active hydrogen group selected from the group consisting of —SH, —SO$_2$H, —SO$_3$H, —NH$_2$, —NHR, —OH, —COON, —B(OH)$_2$, —PO(OH)$_2$, —NHCOH, —NHCOR, and NHSOR.

4. The medium of claim 3, wherein the metal complex polymer is represented by either formula (3) or formula (4) below:

wherein n is an integer between 2 and 6;

R1, R2, R3, and R4 comprise an atom or group selected from the group consisting of a hydrogen atom, a halogen atom selected from the group consisting of a fluorine atom, a chlorine atom, and a bromine atom, a hydroxyl group, an amino group, a nitro group, a cyano group, a carboxyl group, an alkoxycarbonyl group, an aralkyloxycarbonyl group, an aryloxycarbonyl group, an acyl group, an arylcarbonyl group, a heteroarylcarbonyl group, an alkyl group an aralkyl group, an aryl group, a heteroaryl group, an alkenyl group, an alkinyl group, a metalocenyl group, an alkoxy group, an aralkyloxy group, an aryloxy group, a heteroaryloxy group, an acyloxy group, an alkylthio group, an aralkylthio group, an arylthio group, a heteroarylthio group, an alkylamino group, an arylamino group, a heteroarylamino group, an alkylcarbonylamino group, an arylcarbonylamino group, a phenyl group, a phthaloimide group, and a barbituric acid group; and the central metal (Me) is selected from the group consisting of magnesium, aluminum, scandium, titanium, vanadium, chromium, manganese, iron, cobalt, nickel, copper, zinc, zirconium, ruthenium, rhodium, palladium, indium, tin, hafnium, osmium, platinum, gold, silver, tantalum, tungsten, molybdenum, and yttrium.

* * * * *